US010615926B2

(12) United States Patent
Park

(10) Patent No.: US 10,615,926 B2
(45) Date of Patent: *Apr. 7, 2020

(54) METHOD AND APPARATUS OF CONTROLLING FOR UPLINK SCHEDULING AND HARQ TIMING

(71) Applicants: SK TELECOM CO., LTD., Seoul (KR); INNOSKY, Seoul (KR)

(72) Inventor: Dong Hyun Park, Seoul (KR)

(73) Assignees: SK TELECOM CO., LTD., Seoul (KR); INNOSKY, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/456,853

(22) Filed: Jun. 28, 2019

(65) Prior Publication Data

US 2019/0327035 A1    Oct. 24, 2019

Related U.S. Application Data

(63) Continuation of application No. 15/686,613, filed on Aug. 25, 2017, now Pat. No. 10,389,492, which is a
(Continued)

(51) Int. Cl.
*H04L 1/18* (2006.01)
*H04L 5/00* (2006.01)
*H04L 5/14* (2006.01)

(52) U.S. Cl.
CPC .......... *H04L 1/1861* (2013.01); *H04L 5/0055* (2013.01); *H04L 1/1816* (2013.01);
(Continued)

(58) Field of Classification Search
CPC ........... H04B 1/50; H04B 1/56; H04W 28/04; H04W 88/06; H04L 29/06
(Continued)

(56) References Cited

U.S. PATENT DOCUMENTS

2011/0176461 A1   7/2011  Astely et al.
2012/0057547 A1   3/2012  Löhr et al.
(Continued)

FOREIGN PATENT DOCUMENTS

CN    103249163 A    8/2013
CN    103262455 A    8/2013
(Continued)

OTHER PUBLICATIONS

International Search Report for International Patent Application No. PCT/KR2014/009344, dated Jan. 14, 2015.
(Continued)

*Primary Examiner* — Mark H Rinehart
*Assistant Examiner* — Sanjay K Dewan
(74) *Attorney, Agent, or Firm* — Paratus Law Group, PLLC

(57) ABSTRACT

The present invention relates to an apparatus and method for controlling an uplink (UL) scheduling and Hybrid Automatic Repeat reQuest (HARQ) timing supported in a TDD-FDD CA environment. According to aspects of the present invention, in a TDD-FDD carrier aggregation deployment environment, an efficient UL scheduling/HARQ operation may be performed for a UE in which a cross-carrier scheduling is configured.

20 Claims, 20 Drawing Sheets

Related U.S. Application Data continuation of application No. 14/506,469, filed on Oct. 3, 2014, now Pat. No. 9,768,918.

(52) U.S. Cl.
CPC ............ *H04L 5/001* (2013.01); *H04L 5/0073* (2013.01); *H04L 5/1469* (2013.01)

(58) Field of Classification Search
USPC .......................................................... 370/278
See application file for complete search history.

(56) References Cited

U.S. PATENT DOCUMENTS

| | | |
|---|---|---|
| 2012/0106404 A1 | 5/2012 | Damnjanovic |
| 2012/0230232 A1 | 9/2012 | Ji et al. |
| 2012/0257552 A1 | 10/2012 | Chen et al. |
| 2012/0257554 A1 | 10/2012 | Kim et al. |
| 2013/0003673 A1 | 1/2013 | Dinan |
| 2013/0034028 A1 | 2/2013 | Chen et al. |
| 2013/0044662 A1 | 2/2013 | Kwon et al. |
| 2013/0176918 A1 | 7/2013 | Fu et al. |
| 2013/0188532 A1 | 7/2013 | Zhang et al. |
| 2013/0208634 A1 | 8/2013 | Ji et al. |
| 2013/0265914 A1 | 10/2013 | Ahn et al. |
| 2014/0003303 A1 | 1/2014 | Yang et al. |
| 2014/0022964 A1 | 1/2014 | Guan et al. |
| 2014/0078941 A1 | 3/2014 | Seo et al. |
| 2014/0153449 A1 | 6/2014 | Seo et al. |
| 2015/0043392 A1 | 2/2015 | Susitaival et al. |
| 2015/0085711 A1 | 3/2015 | Wang et al. |
| 2015/0085713 A1 | 3/2015 | He et al. |
| 2015/0117275 A1 | 4/2015 | Park |
| 2015/0146588 A1 | 5/2015 | Park |
| 2015/0173102 A1 | 6/2015 | Ruiz Delgado et al. |
| 2015/0208415 A1 | 7/2015 | Xu et al. |
| 2015/0215078 A1 | 7/2015 | Chen et al. |
| 2015/0263846 A1 | 9/2015 | Lee et al. |
| 2015/0305000 A1 | 10/2015 | Nguyen et al. |
| 2016/0013896 A1* | 1/2016 | Sun ........................ H04L 5/14 370/280 |

FOREIGN PATENT DOCUMENTS

| | | |
|---|---|---|
| WO | WO 2012/124980 A2 | 9/2012 |
| WO | WO 2012/124996 A2 | 9/2012 |

OTHER PUBLICATIONS

Written Opinion for International Patent Application No. PCT/KR2014/009344, dated Jan. 14, 2015.

"3$^{rd}$ Generation Partnership Project; Technical Specification Group Radio Access Network; Evolved Universal Terrestrial Radio Access (E-UTRA); Physical layer procedures (Release 11)", 3GPP TS 36.213 V11.4.0, Sep. 2013, pp. 1-182, 3GPP Organizational Partners.

Chinese Office Action for related CN application No. 201480054683.7 dated Oct. 19, 2018 from Chinese Patent Office.

* cited by examiner

FIG. 5
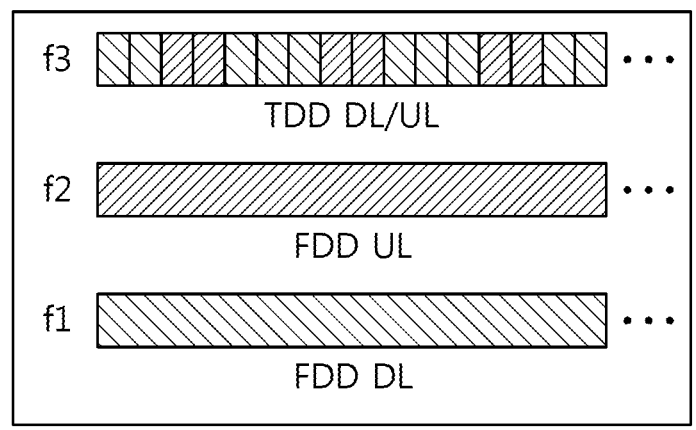
(a) CA of TDD & FDD
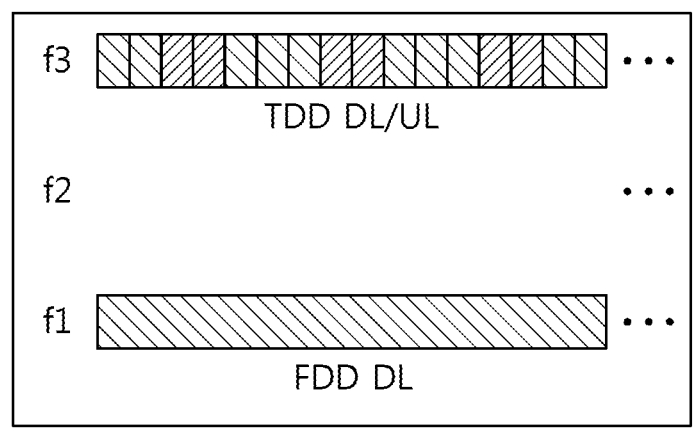
(b) CA of TDD & FDD DL
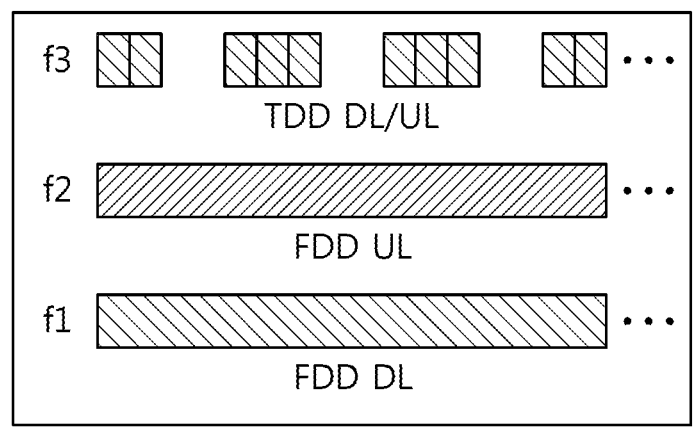
(c) CA of TDD DL & FDD

FIG. 6

| Pcell(TDD#0) | Process# | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|---|---|---|---|---|---|---|---|---|---|
| | | D | S | U | U | U | D | S | U | U | U | D | S | U | U | U | D | S | U | U | U | D | S | U | U | U | D | S | U | U | U |
| | 0 | G/H | | | | | | | | | | | | | | | | | | | | | | | | | | | | | |
| | 1 | | G/H | | | | | | | | | | | | | | | | | | | | | | | | | | | | |
| | 2 | | G/H | | | | | | | | | | | | | | | | | | | | | | | | | | | | |
| | 3 | | | | | | G/H | | | | | | | | | | | | | | | | | | | | | | | | |
| | 4 | | | | | | G/H | | | | | | | | | | | | | | | | | | | | | | | | |
| | 5 | | | | | | | G/H | | | | | | | | | | | | | | | | | | | | | | | |
| | 6 | | | | | | | G/H | | | | | | | | | | | | | | | | | | | | | | | |

| Scell (FDD) | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| | D | D | D | D | D | D | D | D | D | D | D | D | D | D | D | D | D | D | D | D |
| | U | U | U | U | U | U | U | U | U | U | U | U | U | U | U | U | U | U | U | U |
| | | | | | P | | | | | | | | | | P | | | | | |
| | | | | | | P | | | | | | | | | | P | | | | |
| | | | | | | | | | | P | | | | | | | | | | |
| | | | | | | | | | | | P | | | | | | | | | |

FIG. 7

| Pcell(TDD#0) | index of G/H | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|
| | | D | S | U | U | U | D | S | U | U | U | D | S | U | U | U | D | S | U | U | U |
| | 1 | G/H(4) | | | | | | | | | | | | | | | | | | | |
| | 2 | G/H(5) | | | | | | | | | | | | | | | | | | | |
| | 3 | | G/H(5) | | | | | | | | | | | | | | | | | | |
| | 4 | | G/H(6) | | | | | | | | | | | | | | | | | | |
| | 5 | | G/H(7) | | | | | | | | | | | | | | | | | | |
| | 6 | | | | | | G/H(4) | | | | | | | | | | | | | | |
| | 7 | | | | | | G/H(5) | | | | | | | | | | | | | | |
| | 8 | | | | | | | G/H(5) | | | | | | | | | | | | | |
| | 9 | | | | | | | G/H(6) | | | | | | | | | | | | | |
| | 10 | | | | | | | G/H(7) | | | | | | | | | | | | | |

| Scell (FDD) | index of G/H | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|
| | | D | D | U | U | D | D | D | D | U | U | D | D | U | U | D | D | D | D | U | U |
| | 1 | | | | | P(6) | | | | | | | | | | | | | | | |
| | 2 | | | | | | P(5) | | | | | | | | | | | | | | |
| | 3 | | | | | | | P(5) | | | | | | | | | | | | | |
| | 4 | | | | | | | | P(4) | | | | | | | | | | | | |
| | 5 | | | | | | | | | P(13) | | | | | | | | | | | |
| | 6 | | | | | | | | | | P(6) | | | | | | | | | | |
| | 7 | | | | | | | | | | | P(5) | | | | | | | | | |
| | 8 | | | | | | | | | | | | P(5) | | | | | | | | |
| | 9 | | | | | | | | | | | | | P(4) | | | | | | | |
| | 10 | | | | | | | | | | | | | | P(13) | | | | | | |

FIG. 8

| Pcell(TDD#0) | index of G/H | 0 D | 1 S | 2 U | 3 U | 4 U | 5 D | 6 S | 7 U | 8 U | 9 U | 0 D | 1 S | 2 U | 3 U | 4 U | 5 D | 6 S | 7 U | 8 U | 9 U |
|---|---|---|---|---|---|---|---|---|---|---|---|---|---|---|---|---|---|---|---|---|---|
| | 1 | G/H(4) | | | | | | | | | | | | | | | | | | | |
| | 2 | G/H(5) | | | | | | | | | | | | | | | | | | | |
| | 3 | G/H(6) | | | | | | | | | | | | | | | | | | | |
| | 4 | | G/H(6) | | | | | | | | | | | | | | | | | | |
| | 5 | | G/H(7) | | | | | | | | | | | | | | | | | | |
| | 6 | | | | | | G/H(4) | | | | | | | | | | | | | | |
| | 7 | | | | | | G/H(5) | | | | | | | | | | | | | | |
| | 8 | | | | | | G/H(6) | | | | | | | | | | | | | | |
| | 9 | | | | | | | G/H(6) | | | | | | | | | | | | | |
| | 10 | | | | | | | G/H(7) | | | | | | | | | | | | | |

| Scell (FDD) | index of G/H | 0 D | 1 D | 2 D | 3 D | 4 U | 5 U | 6 U | 7 U | 8 D | 9 D | 0 D | 1 D | 2 D | 3 D | 4 U | 5 U | 6 U | 7 U | 8 D | 9 D |
|---|---|---|---|---|---|---|---|---|---|---|---|---|---|---|---|---|---|---|---|---|---|
| | 1 | | | | | | | | | | | | | | | | | | | | |
| | 2 | | | | | P(5) | | | | | | | | | | | | | | | |
| | 3 | | | | | | | P(4) | | | | | | | | | | | | | |
| | 4 | | | | | P(6) | | | | | | | | | | | | | | | |
| | 5 | | | | | | | | P(4) | | | | | | | | | | | | |
| | 6 | | | | | | | | | P(13) | | | | | | | | | | | |
| | 7 | | | | | | | | | | P(6) | | | | | | | | | | |
| | 8 | | | | | | | | | | | P(5) | | | | | | | | | |
| | 9 | | | | | | | | | | | | P(4) | P(4) | | | | | | | |
| | 10 | | | | | | | | | | | | | | P(13) | | | | | | |

FIG. 9

| Pcell(TDD#1) | index of G/H | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|
| | | D | S | U | U | D | D | D | S | U | U | D | S | U | U | D | D | D | S | U | U | D |
| | 1 | G/H(4) | | | | | | | | | | | | | | | | | | | |
| | 2 | G/H(5) | | | | | | | | | | | | | | | | | | | |
| | 3 | | G/H(5) | | | | | | | | | | | | | | | | | | |
| | 4 | | G/H(6) | | | | | | | | | | | | | | | | | | |
| | 5 | | | | | G/H(4) | | | | | | | | | | | | | | | |
| | 6 | | | | | | G/H(4) | | | | | | | | | | | | | | |
| | 7 | | | | | | G/H(5) | | | | | | | | | | | | | | |
| | 8 | | | | | | | G/H(5) | | | | | | | | | | | | | |
| | 9 | | | | | | | G/H(6) | | | | | | | | | | | | | |
| | 10 | | | | | | | | | | G/H(4) | | | | | | | | | | |

| Scell (FDD) | index of G/H | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|
| | | D | D | U | D | D | D | D | D | D | D | D | D | U | D | D | D | D | D | D | D |
| | 1 | | | | | P(6) | | | | | | | | | | | | | | | |
| | 2 | | | | | | P(5) | | | | | | | | | | | | | | |
| | 3 | | | | | | | P(5) | | | | | | | | | | | | | |
| | 4 | | | | | | | | P(4) | | | | | | | | | | | | |
| | 5 | | | | | | | | | P(6) | | | | | | | | | | | |
| | 6 | | | | | | | | | | P(6) | | | | | | | | | | |
| | 7 | | | | | | | | | | | P(5) | | | | | | | | | |
| | 8 | | | | | | | | | | | | P(5) | | | | | | | | |
| | 9 | | | | | | | | | | | | | P(4) | | | | | | | |
| | 10 | | | | | | | | | | | | | | P(6) | | | | | | |

FIG. 10

| Pcell(TDD#2) | index of G/H | 0 D | 1 S | 2 U | 3 D | 4 D | 5 D | 6 S | 7 U | 8 D | 9 D |
|---|---|---|---|---|---|---|---|---|---|---|---|
| | 1 | G/H(4) | | | | | | | | | |
| | 2 | | G/H(4) | | | | | | | | |
| | 3 | | G/H(5) | | | | | | | | |
| | 4 | | | | G/H(4) | | | | | | |
| | 5 | | | | | G/H(4) | | | | | |
| | 6 | | | | | | G/H(4) | | | | |
| | 7 | | | | | | | G/H(4) | | | |
| | 8 | | | | | | | G/H(5) | | | |
| | 9 | | | | | | | | | G/H(4) | |
| | 10 | | | | | | | | | | |

| Scell (FDD) | index of G/H | 0 D | 1 D | 2 U | 3 D | 4 D | 5 D | 6 D | 7 D | 8 D | 9 D |
|---|---|---|---|---|---|---|---|---|---|---|---|
| | 1 | | | | | P(6) | | | | | |
| | 2 | | | | | | P(6) | | | | |
| | 3 | | | | | | | P(5) | | | | |
| | 4 | | | | | | | | P(6) | | |
| | 5 | | | | | | | | | P(6) | |
| | 6 | | | | | | | | | | P(6) |
| | 7 | | | | | | | | | | |
| | 8 | | | | | | | | | | |
| | 9 | | | | | | | | | | |
| | 10 | | | | | | | | | | |

FIG. 11

| Pcell(TDD#3) | index of G/H | 0 D | 1 S | 2 U | 3 U | 4 U | 5 D | 6 D | 7 D | 8 D | 9 D | 0 D | 1 S | 2 U | 3 U | 4 U | 5 D | 6 D | 7 D | 8 D | 9 D |
|---|---|---|---|---|---|---|---|---|---|---|---|---|---|---|---|---|---|---|---|---|---|
| | 1 | G/H(4) | | | | | | | | | | | | | | | | | | | |
| | 2 | G/H(6) | | | | | | | | | | | | | | | | | | | |
| | 3 | | G/H(6) | | | | | | | | | | | | | | | | | | |
| | 4 | | G/H(7) | | | | | | | | | | | | | | | | | | |
| | 5 | | | | | | G/H(4) | | | | | | | | | | | | | | |
| | 6 | | | | | | | G/H(4) | | | | | | | | | | | | | |
| | 7 | | | | | | | | G/H(4) | | | | | | | | | | | | |
| | 8 | | | | | | | | | G/H(4) | | | | | | | | | | | |
| | 9 | | | | | | | | | | G/H(4) | | | | | | | | | | |
| | 10 | | | | | | | | | | G/H(6) | | | | | | | | | | |

| Scell (FDD) | index of G/H | 0 D | 1 D | 2 U | 3 U | 4 U | 5 D | 6 D | 7 D | 8 D | 9 D | 0 D | 1 D | 2 U | 3 U | 4 U | 5 D | 6 D | 7 D | 8 D | 9 D |
|---|---|---|---|---|---|---|---|---|---|---|---|---|---|---|---|---|---|---|---|---|---|
| | 1 | | | | | P(6) | | | | | | | | | | | | | | | |
| | 2 | | | | | | | P(4) | | | | | | | | | | | | | |
| | 3 | | | | | | | | P(4) | | | | | | | | | | | | |
| | 4 | | | | | | | | | P(13) | | | | | | | | | | | |
| | 5 | | | | | | | | | | P(6) | | | | | | | | | | |
| | 6 | | | | | | | | | | | P(6) | | | | | | | | | |
| | 7 | | | | | | | | | | | | P(6) | | | | | | | | |
| | 8 | | | | | | | | | | | | | P(6) | | | | | | | |
| | 9 | | | | | | | | | | | | | | P(6) | | | | | | |
| | 10 | | | | | | | | | | | | | | | | P(4) | | | | |

FIG. 12

| Pcell(TDD#4) | index of G/H | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|
| | | D | S | U | D | D | D | D | D | D | D | D | S | U | D | D | D | D | D | D | D |
| | 1 | G/H(4) | | | | | | | | | | | | | | | | | | | |
| | 2 | G/H(5) | | | | | | | | | | | | | | | | | | | |
| | 3 | | | G/H(5) | | | | | | | | | | | | | | | | | |
| | 4 | | | G/H(6) | | | | | | | | | | | | | | | | | |
| | 5 | | | | | G/H(4) | | | | | | | | | | | | | | | |
| | 6 | | | | | | | G/H(4) | | | | | | | | | | | | | |
| | 7 | | | | | | | | G/H(4) | | | | | | | | | | | | |
| | 8 | | | | | | | | | G/H(4) | | | | | | | | | | | |
| | 9 | | | | | | | | | | G/H(4) | | | | | | | | | | |
| | 10 | | | | | | | | | | | | | | | | | | | | |

| Scell (FDD) | index of G/H | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|
| | | D | U | D | D | D | U | D | D | D | U | D | U | D | D | D | U | D | D | D | U |
| | 1 | | | | | P(6) | | | | | | | | | | | | | | | |
| | 2 | | | | | | P(5) | | | | | | | | | | | | | | |
| | 3 | | | | | | | P(5) | | | | | | | | | | | | | |
| | 4 | | | | | | | | P(4) | | | | | | | | | | | | |
| | 5 | | | | | | | | | P(6) | | | | | | | | | | | |
| | 6 | | | | | | | | | | P(6) | | | | | | | | | | |
| | 7 | | | | | | | | | | | P(6) | | | | | | | | | |
| | 8 | | | | | | | | | | | | P(6) | | | | | | | | |
| | 9 | | | | | | | | | | | | | P(6) | | | | | | | |
| | 10 | | | | | | | | | | | | | | P(6) | | | | | | |

FIG. 13

| Pcell(TDD#5) | index of G/H | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|
| | | D | S | U | D | D | D | D | D | D | D | D | S | U | D | D | D | D | D | D | D |
| | 1 | G/H(4) | | | | | | | | | | | | | | | | | | | |
| | 2 | | G/H(4) | | | | | | | | | | | | | | | | | | |
| | 3 | | G/H(5) | | | | | | | | | | | | | | | | | | |
| | 4 | | | | G/H(4) | | | | | | | | | | | | | | | | |
| | 5 | | | | | | G/H(4) | | | | | | | | | | | | | | |
| | 6 | | | | | | | G/H(4) | | | | | | | | | | | | | |
| | 7 | | | | | | | | G/H(4) | | | | | | | | | | | | |
| | 8 | | | | | | | | | G/H(4) | | | | | | | | | | | |
| | 9 | | | | | | | | | | G/H(4) | | | | | | | | | | |
| | 10 | | | | | | | | | | | | | | | | | | | | |

| Scell (FDD) | index of G/H | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|
| | | D | D | U | D | D | D | U | D | U | U | D | D | U | D | D | D | U | D | U | U |
| | 1 | | | | | P(6) | | | | | | | | | | | | | | | |
| | 2 | | | | | | P(6) | | | | | | | | | | | | | | |
| | 3 | | | | | | | P(5) | | | | | | | | | | | | | |
| | 4 | | | | | | | | P(6) | | | | | | | | | | | | |
| | 5 | | | | | | | | | P(6) | | | | | | | | | | | |
| | 6 | | | | | | | | | | P(6) | | | | | | | | | | |
| | 7 | | | | | | | | | | | P(6) | | | | | | | | | |
| | 8 | | | | | | | | | | | | P(6) | | | | | | | | |
| | 9 | | | | | | | | | | | | | P(6) | | | | | | | |
| | 10 | | | | | | | | | | | | | | P(6) | | | | | | |

FIG. 14

| Pcell(TDD#6) | index of G/H | 0 D | 1 S | 2 U | 3 U | 4 U | 5 D | 6 S | 7 U | 8 U | 9 D |
|---|---|---|---|---|---|---|---|---|---|---|---|
| | 1 | G/H(5) | | | | | | | | | |
| | 2 | G/H(7) | | | | | | | | | |
| | 3 | | G/H(5) | | | | | | | | |
| | 4 | | G/H(7) | | | | | | | | |
| | 5 | | | | | | G/H(4) | | | | |
| | 6 | | | | | | G/H(7) | | | | |
| | 7 | | | | | | | G/H(4) | | | |
| | 8 | | | | | | | G/H(5) | | | |
| | 9 | | | | | | | G/H(7) | | | |
| | 10 | | | | | | | | | | G/H(5) |

| Scell (FDD) | index of G/H | 0 D/U | 1 D/U | 2 D/U | 3 D/U | 4 D/U | 5 D/U | 6 D/U | 7 D/U | 8 D/U | 9 D/U |
|---|---|---|---|---|---|---|---|---|---|---|---|
| | 1 | | | | | | P(5) | | | | |
| | 2 | | | | | | | P(5) | P(13) | | |
| | 3 | | | | | | | | | P(13) | |
| | 4 | | | | | | | | | | P(6) |
| | 5 | | | | | | | | | | P(6) |
| | 6 | | | P(13) | | | | | | | |
| | 7 | | P(5) | | | | | | | | |
| | 8 | | P(6) | | | | | | | | |
| | 9 | | | | P(13) | | | | | | |
| | 10 | | | | | P(5) | | | | | |

FIG. 17

| Pcell (FDD) | index of G/H | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|---|---|---|---|---|---|---|---|---|---|
| | | D | D | U | D | D | D | D | D | D | D | D | D | U | D | D | D | D | D | D | D | | | | | | | | | | |
| | 1 | G/H(4) | | | | | | | | | | | | | | | | | | | | | | | | | | | | | |
| | 2 | | | G/H(4) | | | | | | | | | | | | | | | | | | | | | | | | | | | |
| | 3 | | | | | G/H(4) | | | | | | | | | | | | | | | | | | | | | | | | | |
| | 4 | | | | | | | G/H(4) | | | | | | | | | | | | | | | | | | | | | | | |
| | 5 | | | | | | | | | G/H(4) | | | | | | | | | | | | | | | | | | | | | |
| | 6 | | | | | | | | | | | G/H(4) | | | | | | | | | | | | | | | | | | | |

| Scell (TDD#0) | index of G/H | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|
| | | D | S | U | U | U | D | S | U | U | U | D | S | U | U | U | D | S | U | U | U |
| | 1 | | | | | P(6) | | | | | | | | | | | | | | | |
| | 2 | | | | | | | | P(6) | | | | | | | | | | | | |
| | 3 | | | | | | | | | P(6) | | | | | | | | | | | |
| | 4 | | | | | | | | | | P(6) | | | | | | | | | | |
| | 5 | | | | | | | | | | | | | P(6) | | | | | | | |
| | 6 | | | | | | | | | | | | | | P(6) | | | | | | |

METHOD AND APPARATUS OF CONTROLLING FOR UPLINK SCHEDULING AND HARQ TIMING

CROSS-REFERENCE TO RELATED APPLICATIONS

This application is a Continuation Application of U.S. patent application Ser. No. 15/686,613 (filed on Aug. 25, 2017), which is a Continuation Application of U.S. patent application Ser. No. 14/506,469 (filed on Oct. 3, 2014 and issued as U.S. Pat. No 9,768,918 on Sep. 19, 2017), which claims priority to Korean Patent Application No. 10-2013-0118778 (filed on Oct. 4, 2013), which are all hereby incorporated by reference in their entirety.

BACKGROUND

1. Field

The present invention relates to a wireless communication and, more particularly, to a method and apparatus for controlling uplink (UL) scheduling and Hybrid Automatic Repeat reQuest (HARQ) timing capable of being supported in a next generation Long Term Evolution (LTE) system.

2. Discussion of the Background

Automatic repeat request (ARQ) is one of the schemes that enhance reliability of a wireless communication. The ARQ refers to a scheme in which a transmitter retransmits a data signal if a data signal reception is failed at a receiver. Further, there is a scheme, hybrid automatic repeat request (HARQ), which is a combination of Forward Error Correction (FEC) and ARQ. A receiver that utilizes HARQ generally attempts an error correction for a received data signal and determines whether a retransmission needs to be performed by using an error detection code. As the error detection code, Cyclic Redundancy Check (CRC) scheme may be used. If data signal error is not detected from the detection process of CRC scheme, the receiver determines that a decoding process for the data signal is successful. In this case, the receiver transmits an Acknowledgement (ACK) signal to a transmitter. If data signal error is detected from the detection process of CRC scheme, the receiver determines that a decoding process for the data signal is not successful. In this case, the receiver transmits a Not-Acknowledgement (NACK) signal to a transmitter. If the transmitter receives the NACK signal, the transmitter may retransmit the data signal.

A wireless communication system may support Frequency Division Duplex (FDD) scheme and Time Division Duplex (TDD) scheme. In the FDD scheme, an uplink transmission and a downlink transmission may be simultaneously performed in a cell because a carrier frequency for an uplink (UL) transmission is different from a carrier frequency for a downlink (DL) transmission exists. In the TDD scheme, with respect to one cell, an uplink transmission and a downlink transmission are distinguished from each other based on different time slots. In the TDD scheme, a base station and a user equipment perform switching operations between a transmission mode and a reception mode because the same carrier is used for both an uplink transmission and a downlink transmission. In the TDD scheme, a Special Subframe may be added to provide a guard time for switching between the transmission mode and the reception mode. The Special Subframe may include Downlink Pilot Time Slot (DwPTS), Guard Period (GP), and Uplink Pilot Time Slot (UpPTS). According to the TDD scheme, resource amounts for the uplink transmission and resource amounts for the downlink transmission may be asymmetrically assigned through various uplink (UL)-downlink (DL) configurations.

Currently, remaining frequency resources are scarce and various technologies have been utilized in wide frequency bands because of the frequency resource scarcity. For this reason, in order to provide a wideband bandwidth for supporting higher data-rate requirements, each of scattered bands has been configured to satisfy basic requirements to operate an independent system and a carrier aggregation (CA) scheme, which aggregates various frequency bands into one system, has been adopted. Here, each frequency band or carrier capable of an independent operation may be defined as a component carrier (CC). According to the adoption of the carrier aggregation system, ACK/NACK signals corresponding to a plurality of component carriers (CCs) need to be transmitted.

Recently, there is a need for a TDD-FDD CA scheme that aggregates an FDD band (or carrier) with a TDD band (or carrier). In order to perform a TDD-FDD joint operation in accordance with the TDD-FDD CA scheme, a new concept for an uplink scheduling and HARQ timing needs to be introduced. Specifically, in a case where a cross-carrier scheduling between a TDD carrier and a FDD carrier is configured for a user equipment, there is a problem that a plurality of uplink resources of a scheduled cell that is scheduled by a scheduling cell are in idle states without being utilized. To address such problem occurring when TDD-FDD are jointly configured, there is a need for a method for configuring an appropriate and efficient uplink scheduling and HARQ timing with respect to the timing of data signal transmission/reception and the timing of HARQ ACK/NACK signal transmission/reception.

SUMMARY

In accordance with an aspect of the present invention, an object is to provide a method and apparatus for an uplink scheduling.

In accordance with an aspect of the present invention, an object is to provide a method and apparatus for controlling an uplink HARQ timing.

In accordance with an aspect of the present invention, an object is to provide a method and apparatus for an uplink scheduling and HARQ for a user equipment in which both a TDD serving cell and an FDD serving cell are configured.

In accordance with an aspect of the present invention, another object is to provide a method and apparatus for an uplink scheduling and HARQ in a system that supports a carrier aggregation (CA) or a dual connectivity.

According to an exemplary embodiment of the present invention, there is provided a method of a Hybrid Automatic Repeat reQuest (HARQ) process performed by a User Equipment (UE), the UE supporting a cross-carrier scheduling between a Time Division Duplex (TDD) cell and a Frequency Division Duplex (FDD) cell, the method including: receiving cross-carrier scheduling information from a base station; when an FDD cell is configured as a scheduled cell, which is scheduled by a TDD cell, determining a first interval between a Physical Uplink Shared Channel (PUSCH) transmission and a Physical HARQ Indicator Channel (PHICH) transmission; transmitting, from the UE, a PUSCH through the FDD cell, the PUSCH being transmitted in a first subframe of the FDD cell; and receiving a PHICH responsive to the PUSCH through the TDD cell, the PHICH being transmitted in a second subframe of the TDD cell, the second subframe being determined based on the first subframe and the first interval.

According to an exemplary embodiment of the present invention, there is provided a method of a Hybrid Automatic Repeat reQuest (HARQ) process performed by a base station, the base station supporting a cross-carrier scheduling between a Time Division Duplex (TDD) cell and a Frequency Division Duplex (FDD) cell, the method including: transmitting cross-carrier scheduling information to a User Equipment (UE); when an FDD cell is configured as a scheduled cell, which is scheduled by a TDD cell, determining a first interval between a Physical Uplink Shared Channel (PUSCH) transmission and a Physical HARQ Indicator Channel (PHICH) transmission; receiving, from the UE, a PUSCH through the FDD cell, the PUSCH being transmitted in a first subframe of the FDD cell; and transmitting a PHICH responsive to the PUSCH through the TDD cell, the PHICH being transmitted in a second subframe of the TDD cell, the second subframe being determined based on the first subframe and the first interval.

According to aspects of the present invention, a UL scheduling/HARQ operation may be efficiently performed for a UE in which a cross-carrier scheduling and a TDD-FDD carrier aggregation (or a dual connectivity) are configured, and a data transmission rate may be enhanced to satisfy high-data rate requirements for a UE in accordance with the purpose of a carrier aggregation (or a dual connectivity).

BRIEF DESCRIPTION OF THE DRAWINGS

FIG. 5 is a diagram illustrating examples of user equipment capabilities for a TDD-FDD joint operation according to the exemplary embodiment of the present invention.

FIG. 6 is a diagram illustrating an example of a limited UL scheduling on a scheduled cell, in case of cross-carrier scheduling is configured in a TDD-FDD CA-configured UE.

FIG. 7 illustrates an example of the UL scheduling/HARQ timing according to an embodiment of the present invention for the case that TDD UL/DL configuration of the scheduling cell is zero.

FIG. 8 illustrates an example of the UL scheduling/HARQ timing according to the second embodiment for the case that the TDD UL/DL configuration of the scheduling cell is zero.

FIG. 9 illustrates an example of the UL scheduling/HARQ timing according to the embodiment for the case that the TDD UL/DL configuration of the scheduling cell is 1.

FIG. 10 illustrates an example of the UL scheduling/HARQ timing according to the embodiment for the case that the TDD UL/DL configuration of the scheduling cell is 2.

FIG. 11 illustrates an example of the UL scheduling/HARQ timing according to the embodiment for the case that the TDD UL/DL configuration of the scheduling cell is 3.

FIG. 12 illustrates an example of the UL scheduling/HARQ timing according to the embodiment for the case that the TDD UL/DL configuration of the scheduling cell is 4.

FIG. 13 illustrates an example of the UL scheduling/HARQ timing according to the embodiment of the present invention for the case that the TDD UL/DL configuration of the scheduling cell is 5.

FIG. 14 illustrates an example of the UL scheduling/HARQ timing according to the embodiment of the present invention for the case that the TDD UL/DL configuration of the scheduling cell is 6.

FIG. 17 illustrates an example of the UL scheduling/HARQ timing according to an embodiment of the present invention for the case that the scheduling cell is the FDD cell and the scheduled cell is the TDD cell.

DETAILED DESCRIPTION OF THE ILLUSTRATED EMBODIMENTS

Figure 1:
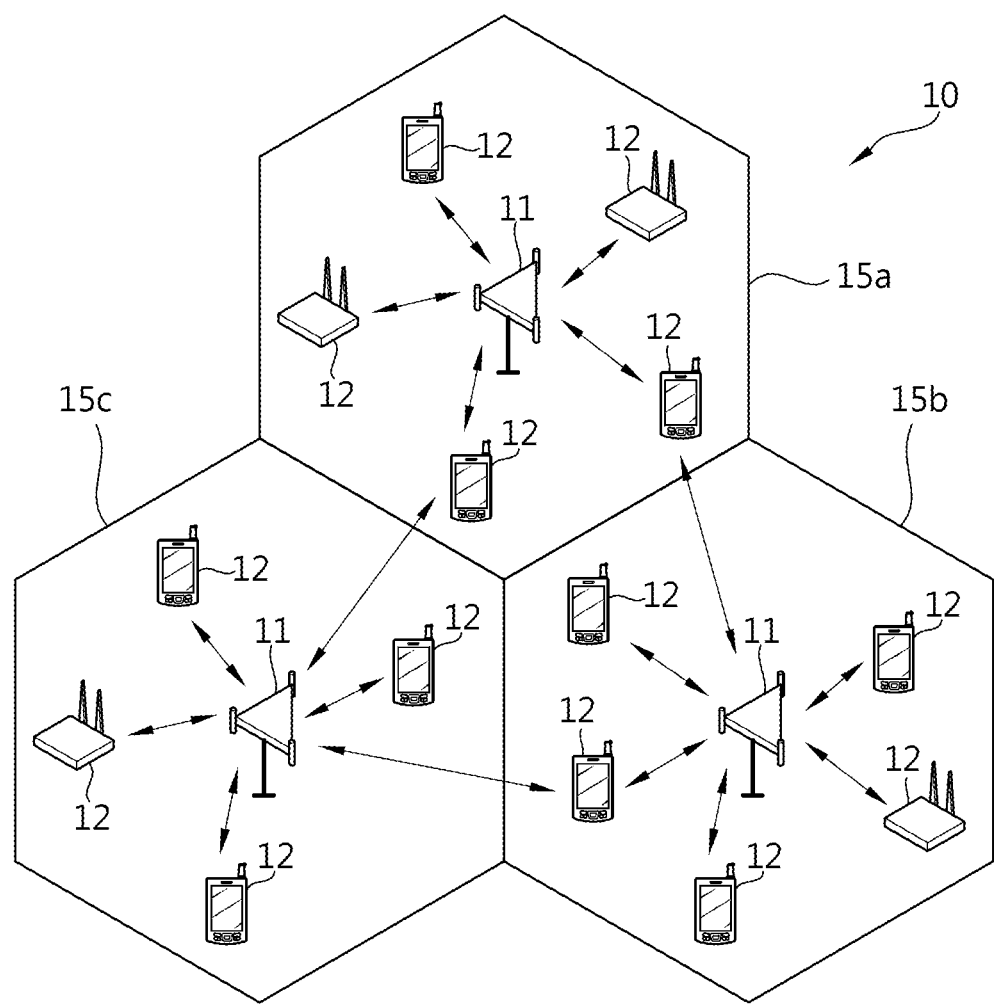
FIG. 1 is a diagram illustrating a wireless communication system according to an exemplary embodiment of the present invention.

Exemplary embodiments of the present invention will be described more fully hereinafter with reference to the accompanying drawings, in which exemplary embodiments of the invention are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. In contrast, when an element is referred to as being "directly on," "directly connected to" or "directly coupled to" another element, there are no intervening elements present.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

According to the exemplary embodiments of the present invention, transmitting controlled channel can be interpreted as control information being transmitted through certain channels. Here, a controlled channel can be either the PDCCH (Physical Downlink Control Channel) or the PUCCH (Physical Uplink Control Channel)

FIG. 1 is a diagram illustrating a wireless communication system according to an exemplary embodiment of the present invention.

According to FIG. 1, a wireless communication system 10 is widely deployed in order to provide diverse telecommunication services, such as voice and packet data. A wireless communication system includes at least one base station 11 (BS). Each BS 11 provides telecommunication service to certain cells 15a, 15b, and 15c. A cell may again be divided into multiple sectors.

User equipment 12 (mobile station, MS) may be located at a certain location or mobile, and may also be referred to as different terms, including UE (user equipment), MT (mobile terminal), UT (user terminal), SS (subscriber station), wireless device, PDA (personal digital assistant), wireless modem, and handheld device. A base station 11 may also be referred to as eNB (evolved-NodeB), BTS (Base Transceiver System), Access Point, femto base station, Home nodeB, and relay. A cell inclusively refers to various coverage areas, such as mega cell, macro cell, micro cell, pico cell, and femto cell.

Hereinafter, the term downlink refers to communication from a base station 11 to a UE 12, and the term uplink refers to communication from a UE 12 to a base station 11. For downlink, a transmitter may be part of a base station 11, and a receiver may be part of a UE 12. For uplink, a transmitter may be part of a UE 12 and a receiver may be part of a base station 11. There is no limitation in the multiple access method applied to a wireless communication system. Diverse methods can be used, including CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA. Uplink transmission and downlink transmission can use either TDD (Time Division Duplex), which uses different time locations for transmissions, or FDD (Frequency Division Duplex), which uses different frequencies for transmissions.

Carrier Aggregation (CA), which is also referred to as spectrum aggregation or bandwidth aggregation, supports multiple carriers. Each individual unit carrier, which is aggregated by carrier aggregation, is referred to as Component Carrier (CC). Each component carrier is defined by bandwidth and center frequency. CA is introduced to support increasing throughput, to prevent cost increase due to the introduction of the wideband radio frequency and to ensure the compatibility with the existing system. For example, if five component carriers are allocated as granularity that has a carrier unit with 20 MHz bandwidth, it can support 100 MHz bandwidth at maximum.

CA can be divided as contiguous carrier aggregation, which is made among continuous CCs, and non-contiguous carrier aggregation, which is made among non-continuous CCs. The number of carriers aggregated between uplink and downlink can be configured differently. It is referred to as symmetric aggregation when there are equal number of downlink CCs and uplink CCs, and it is referred to as asymmetric aggregation when the number of downlink CCs and the number of uplink CCs are not equal.

The size of component carriers (in other words, bandwidth) can be different. For example, if five component carriers are used to form 70 MHz band, 5 MHz component carrier (carrier #0)+20 MHz component carrier (carrier #1)+20 MHz component carrier (carrier #2)+20 MHz component carrier (carrier #3)+5 MHz component carrier (carrier #4) can be aggregated together.

Hereinafter, a multiple carrier system includes the system that supports carrier aggregation. Contiguous CA and/or non-contiguous CA can be used in the multiple carrier system; in addition, both symmetric aggregation and asymmetric aggregation can be used in the multiple carrier system as well. A serving cell can be defined as a component frequency band based on multiple CC system which can be aggregated by CA. A serving cell may include a primary serving cell (PCell) and a secondary serving cell (SCell). A PCell means a serving cell which provides security input and Non-Access Stratum (NAS) mobility information on Radio Resource Control (RRC) establishment or re-establishment state. Depends on the capability of a user equipment, at least one cell can be used together with a PCell to form an aggregation of serving cells, the cell used with a PCell is referred to as an SCell. An aggregation of serving cells which configured for a user equipment may include one PCell, or one PCell together with at least one SCell.

Downlink component carrier corresponding to a PCell refers to Downlink (DL) Primary Component Carrier (PCC), and uplink component carrier corresponding to a PCell refers to Uplink (UL) PCC. In addition, downlink component carrier corresponding to a SCell refers to a DL Secondary Component Carrier (SCC), and an uplink component carrier corresponding to a SCell refers to a UL SCC. Only DL CC may correspond to a serving cell, or a DL CC and an UL CC together may correspond to a serving cell.

Figure 2:
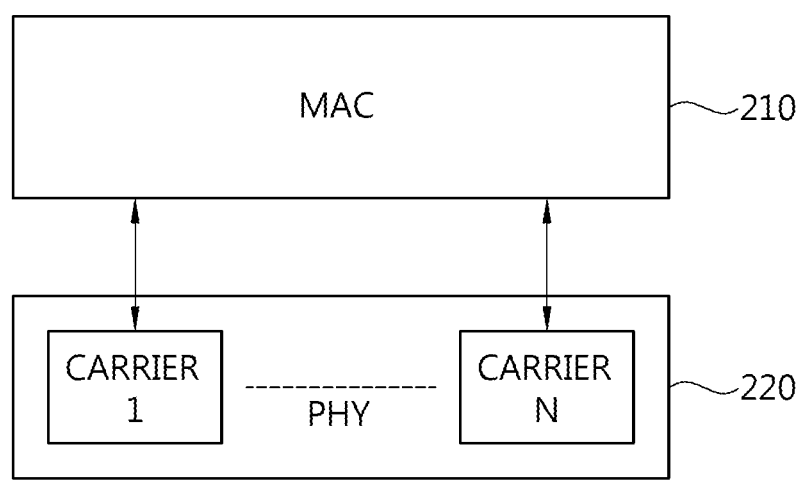
FIG. 2 is a diagram illustrating an example of a protocol structure for supporting a multi-carrier system according to an exemplary embodiment of the present invention.

FIG. 2 is a diagram illustrating an example of a protocol structure for supporting a multi-carrier system according to an exemplary embodiment of the present invention.

Referring to FIG. 2, common Medium Access Control (MAC) entity 210 manages physical layer 220 which uses a plurality of carriers. The MAC management message, transmitting through a certain carrier, may be applied to other carriers. That is, the MAC management message is a message which controls other carriers including the certain carrier mentioned above. A physical layer 220 may be operated by the Time Division Duplex (TDD) and/or the Frequency Division Duplex (FDD).

There are some physical control channels used in physical layer 220. A Physical Downlink Control Channel (PDCCH) informs to a UE with regard to resource allocation of a Paging Channel (PCH) and a Downlink Shared Channel (DL-SCH), and a Hybrid Automatic Repeat Request (HARM) information related to a DL-SCH. The PDCCH may carry uplink grant which informs a resource allocation of uplink transmission to a UE. A Physical Control Format Indicator Channel (PCFICH), which transmits every subframe, informs the number of OFDM symbols used on the PDCCHs to a user equipment. A Physical Hybrid ARQ Indicator Channel (PHICH) carries the HARQ ACK/NACK signals as a response to uplink transmission. That is, the ACK/NACK signal with regard to uplink data transmitted from a UE is transmitted through the PHICH. A Physical Uplink Control Channel (PUCCH) can carry uplink controlling information such as the HARQ ACK/NAK, scheduling request or the CQI. The Physical Uplink Shared Channel (PUSCH) carries the Uplink Shared Channel (UL-SCH). Uplink data transmitting through the PUSCH can be a transport block which is a data block for the UL-SCH. The Physical Random Access Channel (PRACH) carries random access preamble.

A plurality of the PDCCH can be transmitted in the controlled region, and a user equipment can monitor a plurality of the PDCCH. The PDCCH is transmitted on either one Control Channel Element (CCE) or an aggregation of several consecutive CCEs. The CCE is a logical allocation unit used to provide PDCCH with a code rate based on the state of radio channel. The CCE corresponds to a plurality of Resource Element Groups. The format of the PDCCH and the number of available bits for the PDCCH are determined according to the relationship between the number of CCEs and a code rate provided by the CCEs.

Control information carried on the PDCCH is referred to as Downlink Control Information (DCI). The following table 1 shows DCI pursuant to several formats.

TABLE 1

| DCI Format | Description |
| --- | --- |
| 0 | Used for PUSCH scheduling in uplink cell |
| 1 | Used for one PDSCH codeword scheduling in one cell |
| 1A | Used for brief scheduling of one PDSCH codeword in one cell or random access process initialized by the PDCCH command |
| 1B | Used for a brief scheduling of one PDSCH codeword with precoding information in one cell |
| 1C | Used for one PDSCH codeword brief scheduling in one cell or the notification of MCCH change |
| 1D | Used for a brief scheduling of one PDSCH codeword in one cell including precoding or power offset information |
| 2 | Used for the PDSCH scheduling of the user equipment configured of spartial multiplexing mode. |
| 2A | Used for the PDSCH scheduling of the user equipment configured of large delay CDD mode |
| 2B | Used in the transmission mode 8 (a double layer transmission, etc) |
| 2C | Used in the transmission mode 9 (a multi layer transmission) |
| 2D | Used in the transmission mode 10 (CoMP) |
| 3 | Used for the tramission of TPC commands for PUCCH and PUSCH including 2-bit power adjustment |
| 3A | Used for the tramission of TPC commands for PUCCH and PUSCH including single-bit power adjustment |
| 4 | Used for the PUSCH scheduling in the uplink multi-antenna port transmission cell |

Referring to Table 1, There are DCI formats such as format 0 used for the PUSCH scheduling in uplink cell, format 1 used for one PDSCH codeword scheduling in one cell, format 1A used for compact scheduling of one PDSCH codeword, format 2 used for the PDSCH scheduling in closed-loop spartial multiplexing mode, format 2B used for the PDSCH scheduling in open-loop spartial multiplexing mode, format 2B used in the transmission mode 8, format 2C used in the transmission mode 9, format 2D used in the transmission mode 10, format 3 and 3A used for the uplink transmission of TPC commands for the PUCCH and the PUSCH, and format 4 used for the PUSCH scheduling in the uplink multi-antenna port transmission cell.

Each field of DCI is sequentially mapped to n number of information bits $a_0$ or $a_{n-1}$. For example, the DCI is mapped to a total length of 44 bits of information bits, each field of DCI is mapped sequentially to $a_0$ or $a_{43}$. DCI formats 0, 1A, 3, 3A may have the same payload size. DCI format 0, 4 may be referred to as the Uplink grant (UL grant).

Cross-carrier scheduling is a scheduling method capable of performing resource allocation of a PDSCH transmitted by using a different carrier through a PDCCH transmitted through a specific CC and/or resource allocation of a PUSCH transmitted by using another CC other than a CC basically linked to the specific CC. That is, the PDCCH and the PDSCH can be transmitted through different DL CCs, and the PUSCH can be transmitted through a UL CC other than a UL CC linked to a DL CC on which a PDCCH including a UL grant is transmitted.

During cross-carrier scheduling, a user equipment only receives scheduling information (such as UL grant) through a serving cell (or CC). Hereinafter, a serving sell (or CC) performing cross-carrier scheduling may refer to scheduling cell (or CC), and a serving cell being scheduled by scheduling cell may refer to scheduled cell (or CC). Scheduling cell may refer to ordering cell, and scheduled cell may refer to following serving cell.

As such, in a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF). Hereinafter, configuration of CIF may mean that configuration of cross-carrier scheduling.

The aforementioned cross-carrier scheduling can be classified into the DL cross-carrier scheduling and UL cross-carrier scheduling. The DL cross-carrier scheduling implies a case where the CC for transmitting the PDCCH including resource allocation information for the PDSCH transmission and other information is different from a CC for transmitting the PDSCH. The UL cross-carrier scheduling implies a case where a CC for transmitting the PDCCH including a UL grant for the PUSCH transmission is different from the DL CC linked to the UL CC for transmitting the PUSCH.

Figure 3:
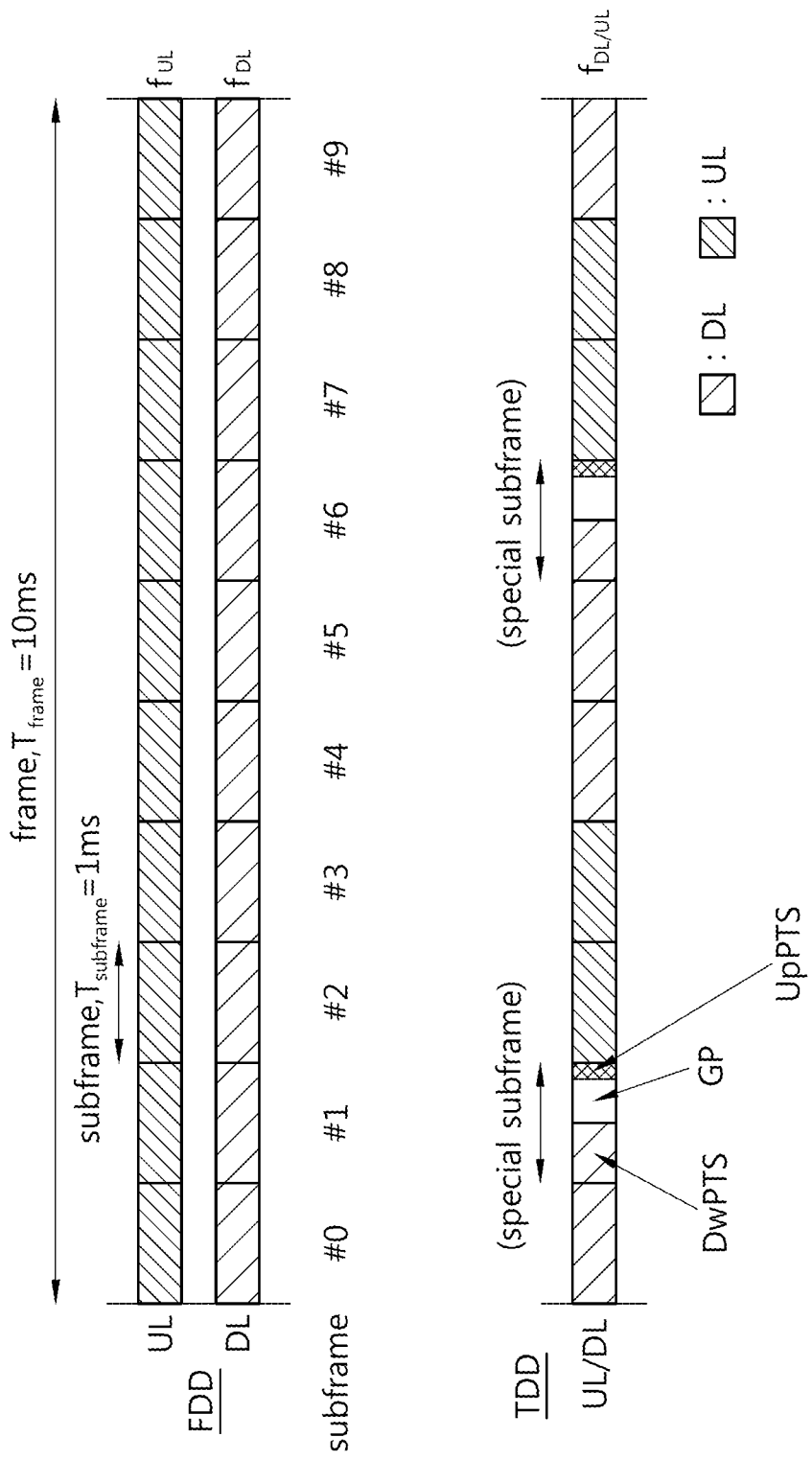
FIG. 3 is a diagram illustrating an example of a radio frame structure according to an exemplary embodiment of the present invention. The diagram illustrates a FDD radio frame structure and a TDD radio frame structure.

FIG. 3 is a diagram illustrating an example of a radio frame structure according to an exemplary embodiment of the present invention. The diagram illustrates a FDD radio frame structure and a TDD radio frame structure.

Referring to FIG. 3, one radio frame includes 10 subframes, and one subframe includes 2 consecutive slots.

In the FDD, both carrier used for UL transmission and carrier used for DL transmission exist, and UL transmission and DL transmission can be performed simultaneously in one cell.

In the TDD, on one cell basis, UL transmission and DL transmission can always distinguished in time. Because a same carrier is used for both UL transmission and DL transmission, a base station and user equipment repeatedly switches between the transmission mode and the reception mode. In the TDD, special subframe can be placed to provide a guard time which is for switing mode between the transmission and the reception. Special subframe, as shown, includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is needed to avoid interference between an uplink and a downlink, and during the GP, no UL transmission and DL transmission occurs.

Table 2 shows an example of UL-DL configuration of radio frame. UL-DL configuration defines reserved subframe for UL transmission or reserved subframe for DL transmission. That is, UL-DL configuration informs the rules how the uplink and the downlink are allocated (or reserved) in every subframe of one radio frame.

TABLE 2

| Uplink-downlink congifuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 m | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, 'D' denotes a DL subframe, 'U' denotes a UL subframe, and 'S' denotes a special subframe. As shown to Table 2, subframe 0 and 5 are always allocated to DL transmission, and subframe 2 is always allocated to UL-transmission. As shown to Table 2, each UL-DL configuration has a different number and position of DL subframe and UL subframe in one radio frame. Through diverse UL-DL configuration, the amount of resource allocated to UL/DL transmission can be given asymmetrically. To avoid severe interference between UL and DL among cells, neighboring cells generally have same UL-DL configuration.

The point changing from DL to UL or the point changing from UL to DL is referred to the switching point. The switch-point periodicity, which is either 5 ms or 10 ms, means a repeating period of the same chaining aspect between the UL subframe and DL subframe. For example, referring to the UL/DL configuration 0, subframe from 0 to 4 changes D→S→U→U→U, subframe from 5 to 9 changes, as same as before, D→S→U→U→U. Since one subframe is 1 ms, the switch-point periodicity is 5 ms. That is, the switch-point periodicity is shorter than the length of one radio frame (10 ms), the changing aspect in the radio frame is repeated for one time.

The UL-DL configuration in above Table 2 can be transmitted from a base station to a user equipment through system information. The base station can inform a UL-DL allocation status change in a radio frame to a UE by transmitting the index of the UL-DL configuration whenever the UL-DL configuration changes. Or the UL-DL configuration can be control information which is transmitted to every UE in the cell through broadcast channel.

Meanwhile, the Automatic Repeat Request (ARQ) is one of the schemes that enhance reliability of a wireless communication. The ARQ refers to a scheme in which a transmitter retransmits a data signal if a data signal reception is failed at a receiver. Further, there is a scheme, the hybrid automatic repeat request (HARQ), which is a combination of the Forward Error Correction (FEC) and the ARQ. A receiver that utilizes the HARQ generally attempts an error correction for a received data signal and determines whether a retransmission needs to be performed by using an error detection code. As the error detection code, Cyclic Redundancy Check (CRC) scheme may be used. If data signal error is not detected from the detection process of CRC scheme, the receiver determines that a decoding process for the data signal is successful. In this case, the receiver transmits an Acknowledgement (ACK) signal to a transmitter. If data signal error is detected from the detection process of CRC scheme, the receiver determines that a decoding process for the data signal is not successful. In this case, the receiver transmits a Not-Acknowledgement (NACK) signal to a transmitter. If the transmitter receives the NACK signal, the transmitter may retransmit the data signal.

The UL HARQ is a procedure where a based station transmits the PDCCH/EPDCCH to UE, the UE transmits the PUSCH data at a predetermined timing, and the base station is repeatedly transmitting the corresponding HARQ ACK/NACK through PHICH at a predetermined timing until when the UE receives the ACK signal from the base station. In LTE system, UL HARQ is referred to synchronous UL HARQ transmitting data at a predetermined timing.

Under circumstances such as carrier aggregation, if FDD applies to every serving cell or, same TDD UL/DL configuration applies to serving cells, the PUSCH timing transmitting from PCell and the PUSCH timing transmitting from the SCell can be the same. However, if the TDD UL/DC configuration is different between at least two serving cells, the PUSCH transmission timing can be different.

First, the PUSCH transmission timing with regard to associated with the PHICH, that is, considering the PHICH as a reference point, transmission timing of the PUSCH for which the PHICH transmits ACK/NACK can be shown as below.

In the FDD, if PHICH is received to a user equipment in subframe i, related PUSCH transmission subframe is i−4.

In the TDD, when a single carrier is configured to a user equipment or same TDD UL/DL configuration is applied to every serving cell, and if TDD UL/DL configuration is 1 or 6, the PUSCH transmission timing related to the PHICH received to a UE in subframe i is subframe i−k. In this case, the value of k is given in Table 3 below.

TABLE 3

| TDD UL/DL Configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | | 6 | | | | | | | 6 | 6 |
| 4 | | | | | | | | | 6 | 6 |
| 5 | | | | | | | | | 6 | |
| 6 | 6 | 4 | | | | 7 | 4 | | | 6 |

Table 3 is about the value of index k indicating the PUSCH timing considered in the TDD. Here, k indicates that, when a user equipment received the PHICH in subframe #i, the PUSCH is transmitted in the subframe i−k, which is located k subframes before the subframe i in which the PHICH has transmitted. For example, if the TDD UL/DL configuration is 1, when a user equipment receives the PHICH in subframe #9 (i=9), the PHICH indicates that the PHICH is related to the PUSCH transmitted in subframe #3 (i−k=9−6=3). Meanwhile, when the TDD UL/DL configuration is 0, if the value of $I_{PHICH}$ received to a user equipment from subframe i is 0 as a corresponding resource for receiving, the related PUSCH transmission timing is subframe i−k (refer to Table 3), and if the value of $I_{PHICH}$ is 1 as a corresponding resource for receiving, the related PUSCH transmission timing is subframe i−6.

Meanwhile, in the TDD, if two or more serving cells are configured to a UE, and at least two serving cells have different UL-DL configurations, the PUSCH transmission timing is determined based on the UL-reference UL/DL configuration. Here, the UL-reference UL/DL configuration means a UL/DC configuration which became a basis for the UL HARQ timing in corresponding serving cell.

If two or more serving cells are configured to a user equipment, at least two serving cells have different UL-DL configurations, and the corresponding serving cell is PCell or a user equipment is not configured to monitor the PDCCH/EPDCCH in a different serving cell, the corresponding serving cell sets the UL-reference UL/DL configuration as its own UL/DL configuration.

If two or more serving cells are configured to a UE, at least two serving cells have different UL-DL configurations, the corresponding serving cell is SCell, and a UE is configured to monitor the PDCCH/EPDCCH in a different serving cell, the UL-reference UL/DL configuration for the corresponding serving cell can be shown as Table 4 below.

TABLE 4

| Set # | (other serving cell UL/DL configuration, serving cell UL/DL configuration) | UL-reference UL/DL configuration |
|---|---|---|
| Set 1 | (1, 1), (1, 2), (1, 4), (1, 5) | 1 |
|  | (2, 2), (2, 5) | 2 |
|  | (3, 3), (3, 4), (3, 5) | 3 |
|  | (4, 4), (4, 5) | 4 |
|  | (5, 5) | 5 |
| Set 2 | (1, 0), (2, 0), (3, 0), (4, 0), (5, 0) | 0 |
|  | (2, 1), (4, 1), (5, 1) | 1 |
|  | (5, 2) | 2 |
|  | (4, 3), (5, 3) | 3 |
|  | (5, 4) | 4 |
|  | (1, 6), (2, 6), (3, 6), (4, 6), (5, 6) | 6 |
| Set 3 | (3, 1) | 1 |
|  | (3, 2), (4, 2) | 2 |
|  | (1, 3), (2, 3) | 3 |
|  | (2, 4) | 4 |
| Set 4 | (0, 0), (6, 0) | 0 |
|  | (0, 1), (0, 2), (0, 4), (0, 5), (6, 1), (6, 2), (6, 5) | 1 |
|  | (0, 3), (6, 3) | 3 |
|  | (6, 4) | 4 |
|  | (0, 6), (6, 6) | 6 |

In Table 4, based on the other serving cell UL/DL configuration and the serving cell UL/DL configuration, it indicates the UL-reference UL/DL (or UL-DL) configuration for the corresponding serving cell. For example, the UL-reference UL/DL configuration for the serving cell, if the other serving cell UL/DL configuration and the serving cell UL/DL configuration in Table 4 are belong to Set 1, the UL HARQ timing is applied based on the UL-reference UL/DL configuration for the Set 1.

As described above, if the UL-reference UL/DL configuration is 1 or 6, the PUSCH transmission timing related to the PHICH received to a user equipment in subframe i is subframe i−k. In this case, the value of k is given in Table 3, the "TDD UL/DL configuration" in Table 3 refers to the "UL-reference UL/DL configuration." Meanwhile, when the UL-reference UL/DL configuration in a serving cell is 0, if the value of $I_{PHICH}$ received to a user equipment in subframe i is 0, the related PUSCH transmission timing is subframe i−k (refer to Table 3), and if the value of $I_{PHICH}$ is 1, the related PUSCH transmission timing is subframe i−6.

Next, the PHICH transmission timing associated with regard to the PUSCH transmission, that is, considering the PUSCH as a reference point, PHICH transmission timing indicating the ACK/NACK of the PUSCH can be shown as below.

In the FDD, for the PUSCH transmitted from a user equipment in subframe n, PHICH reception timing (the timing in the base station) is subframe n+$k_{PHICH}$, here $k_{PHICH}$ is always 4. In the TDD, when a single carrier is configured to a UE or same TDD UL/DL configuration is applied to every serving cell, and if TDD UL/DL configuration is 1 or 6, the PHICH transmission timing transmitted from a UE subframe n is subframe n+$k_{PHICH}$, here, the value of $k_{PHICH}$ is given to Table 5 below.

TABLE 5

| TDD UL/DL Configuration | Subframe number n | | | | | | | | | |
|---|---|---|---|---|---|---|---|---|---|---|
|  | 0 | 1 | 2 | 3 | 4 | 5 | 6 | 7 | 8 | 9 |
| 0 |  |  | 4 | 7 | 6 |  |  | 4 | 7 | 6 |
| 1 |  |  | 4 | 6 |  |  |  | 4 | 6 |  |
| 2 |  |  | 6 |  |  |  |  | 6 |  |  |
| 3 |  |  | 6 | 6 | 6 |  |  |  |  |  |
| 4 |  |  | 6 | 6 |  |  |  |  |  |  |
| 5 |  |  | 6 |  |  |  |  |  |  |  |
| 6 |  |  | 4 | 6 | 6 |  |  | 4 | 7 |  |

Table 5 is about the value of index $k_{PHICH}$ indicating the PHICH timing considered in the TDD. Here, $k_{PHICH}$ indicates that, when a UE transmits the PUSCH in subframe n, the PHICH indicating the ACK/NACK of the PUSCH is received in subframe n+$k_{PHICH}$. For example, when the TDD UL/DL configuration is 1, if the UE transmits the PUSCH in subframe #2 (n=2), the related PHICH indicates that the PHICH is received to a user equipment in subframe #6 (n+$k_{PHICH}$=2+4=6).

In the TDD, when two or more carrier is configured to a UE and at least two serving cells have different TDD UL/DL configurations, the PHICH reception timing is determined based on the UL-reference UL/DL configuration. That is, PHICH reception timing associated with PUSCH transmitted by a UE in subframe n of a serving cell is subframe n+$k_{PHICH}$, the value of $k_{PHICH}$ is determined by the above Table 5, and in this case, "TDD UL/DL configuration" in Table 5 refers to the "UL-reference UL/DL configuration."

Further, the PUSCH transmission timing following the UL grant and/or the PHICH reception can be shown as below. Hereinafter, the reception of the UL grant may mean that the PDCCH/EPDCCH having a UL DCI format is detected with respect to the corresponding user equipment.

1. In the FDD, the PUSCH transmission following the UL grant (by PDCCH/EPDCCH) and/or the PHICH transmitted to a user equipment in subframe n is performed in subframe n+4.

2. In the TDD, when a single carrier is configured to user equipment or same TDD UL/DL configuration is applied to every serving cell, the PUSCH transmission timing is as below.

(1) When the TDD UL/DL configuration is either 1 or 6, and there is normal HARQ operation (that is, non-subframe bundling operation), and the detection of the PDCCH/EPDCCH having the UL DCI format and/or the PHICH transmission is happened in subframe n, a user equipment adjusts the corresponding PUSCH transmission to subframe n+k, according to the PDCCH/EPDCCH or PHICICH information. In this case, the value of k is determined by the Table 6 below.

TABLE 6

| TDD UL/DL Configuration | Subframe number n | | | | | | | | | |
|---|---|---|---|---|---|---|---|---|---|---|
|  | 0 | 1 | 2 | 3 | 4 | 5 | 6 | 7 | 8 | 9 |
| 0 | 4 | 6 |  |  |  | 4 | 6 |  |  |  |
| 1 |  | 6 |  |  | 4 |  | 6 |  |  | 4 |
| 2 |  |  |  | 4 |  |  |  |  | 4 |  |
| 3 | 4 |  |  |  |  |  |  |  | 4 | 4 |
| 4 |  |  |  |  |  |  |  |  | 4 | 4 |

TABLE 6-continued

| TDD UL/DL Configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 5 | | | | | | | | | 4 | |
| 6 | | 7 | 7 | | | | 7 | 7 | | 5 |

Here, k indicates that, when user equipment received UL grant (by PDCCH/EPDCCH) and/or PHICH in subframe n, the PUSCH transmission is performed in subframe n+k, which is located k subframes after the subframe n in which the UL grant and/or the PHICH is transmitted.

For example, when the TDD UL/DL configuration is 1, if a UE receives the UL grant and/or PHICH from subframe #1 (n=1), the corresponding PUSCH transmission occurs in subframe #7 (n+k=1+6).

(2) 1) When the TDD UL/DL configuration is 0, and there is normal HARQ operation, and the detection of the PDCCH/EPDCCH having the UL DCI format and/or the PHICH transmission is happened in subframe n, a user equipment adjusts the corresponding PUSCH transmission to subframe n+k, if the most significant bit (MSB) of the UL index included in the PDCCH/EPDCCH having a UL DCI format sets to as 1 or the PHICH, which is corresponding to $I_{PHICH}=0$ is transmitted in subframe n=0 or 5. In this case, k is determined by the above Table 6. 2) If the TDD UL/DL configuration is 0, and there is normal HARQ operation, and, if the least significant bit (LSB) of the UL index set as 1 or the PHICH, which is corresponding to $I_{PHICH}=1$ is transmitted in subframe n=1 or 6, then the UE adjusts the corresponding PUSCH transmission as subframe n+7. 3) If the TDD UL/DL configuration is 0, and the both MSB and LSB included in the PDCCH/EPDCCH having the UL DCI format set in subframe n, the user equipment adjusts the corresponding PUSCH transmission to subframe n+k or subframe n+7. In this case, k is determined by the above Table 6.

3. In the TDD, if two or more serving cells are configured to UE and at least two serving cells have different UL-DL configurations, the PUSCH transmission timing is as below.

(1) When the TDD UL/DL configuration is either 1 or 6, with regard to the serving cell in normal HARQ operation, and the detection of the PDCCH/EPDCCH having the UL DCI format and/or the PHICH transmission is performed in subframe n, a user equipment adjusts the corresponding PUSCH transmission to subframe n+k, according to the PDCCH/EPDCCH or PHCICH information. In this case, the value of k is determined by the above Table 6.

(2) 1) With regard to the serving cell in normal HARQ operation when UL-reference UL/DL configuration is 0, if the detection of the PDCCH/EPDCCH having the UL DCI format and/or the PHICH transmission is performed in subframe n and if the MSB of the UL index included in the PDCCH/EPDCCH set as 1 or the PHICH, which is corresponding to $I_{PHICH}=0$, is transmitted in subframe n=0 or 5, a user equipment adjusts the corresponding PUSCH transmission to subframe n+k. In this case, k is determined by the above Table 6, and "TDD UL/DL configuration" in Table 6 may refer to the "UL-reference UL/DL configuration." 2) With regard to the serving cell in normal HARQ operation when UL-reference UL/DL configuration is 0, if the least significant bit (LSB) of the UL index included in the PDCCH/EPDCCH having DCI format 0/4 set as 1 or the PHICH, which is corresponding to $I_{PHICH}=1$, is transmitted in subframe n=0 or 5, or the PHICH is transmitted in subframe n=1 or 6, then the user equipment adjusts the corresponding PUSCH transmission as subframe n+7. 3) With regard to the serving cell with the TDD UL/DL configuration as 0, if both MSB and LSB of UL index included in the PDCCH/EPDCCH having the UL DCI format set in subframe n, the user equipment adjusts the corresponding PUSCH transmission to subframe n+k or subframe n+7. In this case, k is determined by the above Table 6, and "TDD UL/DL configuration" in Table 6 may refer to the "UL-reference UL/DL configuration."

According to the above-mentioned reference points, under circumstances such as CA, it may be possible to provide efficient wireless resource allocation usage and HARQ operation to each serving cell even when the TDD UL/DL configuration among serving cells are different. However, recently, the FDD band or carrier and the TDD band or carrier joint operation are considered, and when the existing UL scheduling/HARQ timing is applied, a problem exists such as a plurality of UL resources may not be utilized.

Figure 4:
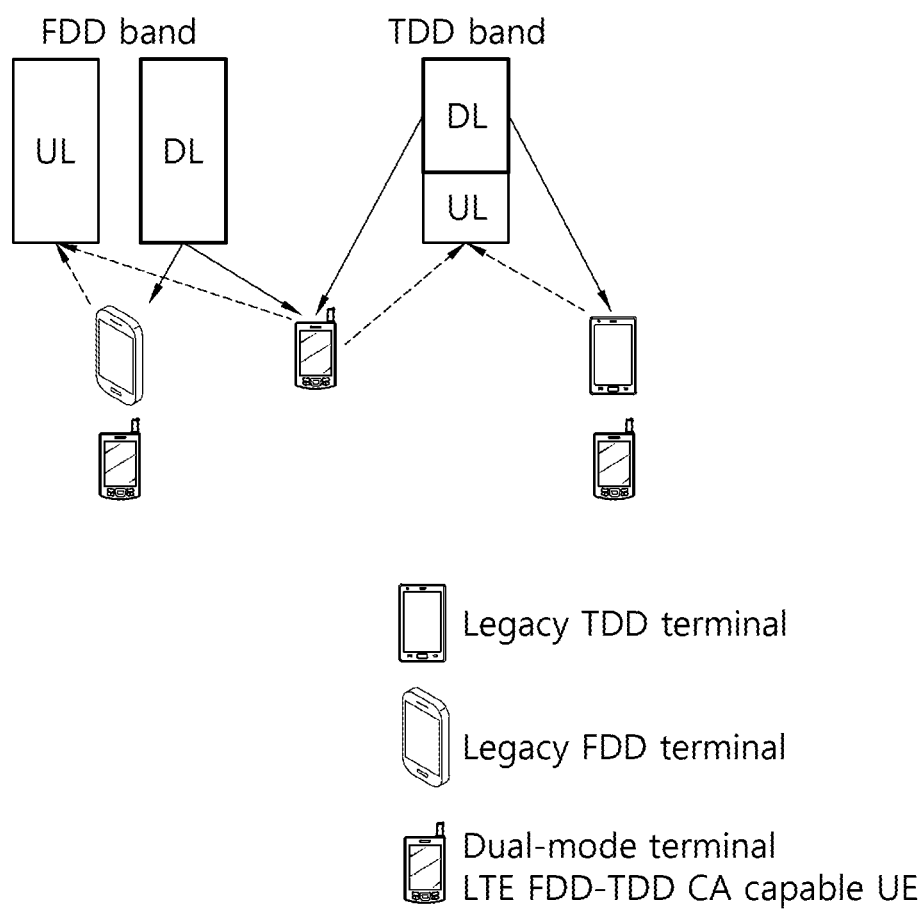
FIG. 4 is a diagram illustrating an example of an FDD-TDD joint operation method application according to an exemplary embodiment of the present invention.

FIG. 4 is a diagram illustrating an example of an FDD-TDD joint operation method application according to an exemplary embodiment of the present invention.

Referring FIG. 4, in case of the TDD legacy UE 120, wireless communication service can only be received through the TDD band, and in case of the legacy FDD UE 140, wireless communication service can only be received through the FDD band. On other hands, in case of the FDD-TDD CA capable UE 100, wireless communication service can be received through the FDD and the TDD bands, and also the CA based wireless communication service is provided through the TDD band carrier and the FDD band carrier.

For those aforementioned TDD-FDD joint operations, for example, the following deployments may be considered.

As an example, the FDD base station and the TDD base station is co-located (for example, CA scenarios 1 through 3), or the FDD base station and the TDD based station is not co-located, but connected through the ideal backhaul (for example, CA scenario 4).

As another example, the FDD base station and the TDD base station is not co-located, and connected through non-ideal backhaul (for example, small cell scenario 2a, 2b, and macro-macro scenario).

In addition, for the TDD-FDD joint operation, following prerequisite may be considered.

First, a UE supporting the FDD-TDD joint operation may access to the legacy FDD single mode carrier and the legacy TDD single mode carrier.

Second, the legacy FDD UEs and the UEs supporting the TDD-FDD joint operation may camp on and be connected to the FDD caner which is the part of the aforementioned FDD/TDD joint operation network.

Third, the legacy TDD UEs and the UEs supporting the TDD-FDD joint operation may camp on and be connected to the TDD caner which is the part of the aforementioned FDD/TDD joint operation network.

Fourth, a network architecture enhancement in order to facilitate the FDD-TDD joint operation, for example, with regard to the non-ideal backhaul, may be considered. However, keeping the minimal network architecture changes should be considered since it is still essential in operator's perspective.

In addition, as a UE to support the TDD-FDD joint operation, following UE abilities may be considered.

FIG. 5 is examples of UE capabilities for the TDD-FDD joint operation according to an exemplary embodiment of the present invention.

Referring to FIG. 5, (a) indicates that a UE is supporting the CA between the TDD carrier and the FDD carrier; (b) indicates that a UE is supporting the CA between the TDD carrier and the FDD DL carrier; and (c) indicates that a UE is supporting the CA between the TDD DL carrier and the FDD carrier.

As mentioned above, a UE may support different types of the TDD-FDD joint operations, and further, it may perform simultaneous reception (that is, DL aggregation) from the FDD and TDD carriers. Secondly, a UE may perform simultaneous transmission (that is, UL aggregation) from the FDD and TDD carriers, and thirdly, a UE may perform simultaneous transmission and reception (that is, full duplex) from the FDD and TDD carriers.

Meanwhile, a UE may configure a dual connectivity through two or more base stations among base stations that may include at least one serving cell. A dual connectivity is an operation that the UE utilizes wireless resources provided by at least two different network points (for example, a macro base station or a small base station) in RRC_CONNECTED mode. In this case, those abovementioned two different network points may be connected by a non-ideal backhaul. Here, one of those abovementioned two different network points may refer to a macro base station (or a master base station or an anchor base station), remaining network points may refer to small base stations (or secondary base stations or assisting base stations, or slave base stations).

A UE, as mentioned above, may support a TDD-FDD joint operation when the CA and/or dual connectivity is configured to a UE. Hereinafter, exemplary embodiments of the present invention will be explained based on a case where a UE configured to the CA, but aspects of the present invention may be applied to a case of a UE configured to the dual connectivity.

The existing UL scheduling and HARQ method supports the CA among carriers having different TDD UL/DL configurations, but it does not support the above mentioned TDD-FDD joint operation.

The UL scheduling/HARQ timing for a UE with the TDD-FDD CA configuration, if the UE has a self-scheduling configuration (that is, scheduling cell is equal to scheduled cell), may provide, without a big problem, peak data rate to the UE, applying the UL scheduling/HARQ timing which corresponds to each of the current duplex modes. However, when a UE is configured to the cross-carrier scheduling (that is, in case of indicating a transmission of the PDCCH/EDPCCH through specific cell by carrier indicator formation (CIF)), a plurality of UL resources may not be utilized, and it cannot provide the peak data rate to the UE. This is because, under the Standard, it is a default that the PHICH, which is for indicating the PUSCH re-transmission, is transmitted only though a cell which the UL grant has transmitted.

FIG. 6 is a diagram illustrating an example of a limited UL scheduling on a scheduled cell, in case of cross-carrier scheduling is configured in a TDD-FDD CA-configured UE. FIG. 6 is a case where a PCell is configured to UE with the TDD UL/DL configuration 0, and a SCell is configured to UE with the FDD. The PCell is considered as the scheduling cell and the SCell as the scheduled cell.

Referring to FIG. 6, G indicates the UL grant, H indicates the PHICH, P indicates the PUSCH, and PCell's G/H (G and/or H) indicates the cross-carrier scheduling for Secondary serving cell. The PCell's subframes 0 and 5 are configured as DL subframes, and subframes 1 and 6 are configured as special subframes. Thus, in this case, G/H may be transmitted from a base station to a UE through subframe #0, 1, 5, and 6. In this case, although the SCell, as the FDD based serving cell, is able to perform the UL transmission in every subframe, according to the existing UL scheduling/HARQ timing, the PUSCH transmission is not performed in subframe #1, 2, 3, 6, 7, 8 and the peak data rate is not provided to a UE. Therefore, new UL scheduling/HARQ timing is designed for the UE which is configured to the TDD-FDD CA and the cross-carrier scheduling.

The following assumptions may be applicable the below exemplary embodiments that suggests a new UL scheduling/HARQ timing for the UE in which TDD-FDD CA and cross carrier scheduling are set up.

(1) The PHICH is transmitted on the serving cell where the UL grant was transmitted.

(2) Support the synchronized HARQ operation.

(3) In case that there is no PHICH resource, the UE assumes to be acknowledged for the corresponding PUSCH transmission, and transmits it to the MAC layer.

(4) The configuration having 10 ms synchronization scheduling/HARQ cycle is considered.

(5) Basically, 2 inter-band CAs (that is, CA of TDD band and FDD band) are considered, but 5 inter-band CAs may also be considered. In this case, it is instructed on CIF that a specific secondary serving cell (SCell) among a plurality of secondary serving cells (SCells) is set up as a scheduling cell while a few among the remainders to be setup as the scheduled cells.

(6) In the aspect of capability of a UE, basically, the UE has to support all of the UL/DL aggregation, and the rest combinations (ex. TDD DL and FDD UL/DL, TDD UL and FDD UL/DL, TDD UL/DL and FDD DL, and so on) may be considered as well.

(7) The possibility of the limited TDD-FDD CA combination may be considered.

Hereinafter, each of all the TDD UL/DL configurations (0 to 6) currently provided and the UL scheduling/HARQ timing method applicable in the CA situation with FDD are suggested. Considering CA scenario between FDD band and TDD band, possible combinations are represented in Table 7 below.

TABLE 7

| Scheduling cell | Scheduled cell |
| --- | --- |
| TDD UL/DL configuration 0 | FDD |
| TDD UL/DL configuration 1 | FDD |
| TDD UL/DL configuration 2 | FDD |
| TDD UL/DL configuration 3 | FDD |
| TDD UL/DL configuration 4 | FDD |
| TDD UL/DL configuration 5 | FDD |
| TDD UL/DL configuration 6 | FDD |
| FDD | TDD UL/DL configuration 0 |
| FDD | TDD UL/DL configuration 1 |
| FDD | TDD UL/DL configuration 2 |
| FDD | TDD UL/DL configuration 3 |
| FDD | TDD UL/DL configuration 4 |
| FDD | TDD UL/DL configuration 5 |
| FDD | TDD UL/DL configuration 6 |

Referring to Table 7, the cross carrier scheduling is setup for the UE in which TDD-FDD CA is setup, the scheduling cell may be setup to one of TDD UL/DL configurations 0 to 6, and the scheduled cell may be setup to FDD. Or, the scheduling cell may be setup to FDD, and the scheduled cell may be setup to one of TDD UL/DL configurations 0 to 6. Hereinafter, it is described to be assumed that the primary serving cell is the scheduling cell and the secondary serving cell is the scheduled cell. Hereinafter, the primary serving cell may be referred to as a main serving cell, and the secondary serving cell may be referred to as a sub-serving cell.

Case 1. In case of TDD (primary serving cell=scheduling cell)–FDD (secondary serving cell=scheduled cell) CA 1. TDD UL/DL configuration 0 (scheduling cell)–FDD (scheduled cell) CA The First Embodiment The present embodiment discloses the timing method designed based on 10 ms HARQ cycle. According to the present embodiment, for the scheduled cell, in at least two subframes (for example, subframes 0 and 5) of the scheduling cell, maximum 2 PUSCH transmission timing may be instructed respectively, and in at least two subframes (for example, subframe 1 and 6) of the scheduling cell, maximum 3 PUSCH transmission timings may be instructed respectively.

FIG. 7 illustrates an example of the UL scheduling/HARQ timing according to an embodiment of the present invention for the case that TDD UL/DL configuration of the scheduling cell is zero. FIG. 7 shows the case that the main serving cell is the scheduling cell configured with the TDD UL/DL configuration being 0 and the sub-serving cell is the scheduled cell configured with the FDD.

Referring to FIG. 7, G represents the UL grant, H represents the PHICH, and P represents the PUSCH, and G/H (G and/or H) in the main serving cell represents the cross carrier scheduling for the sub-serving cell, G/H(m) represents that the PUSCH is transmitted from the mth subframe after the G/H has been transmitted, and P(m) represents that the UL grant/PHICH for retransmission from the mth subframe is transmitted after the PUSCH has been transmitted. Hereinafter, the same cases are applied.

Referring to FIG. 7, sub-frames 0 and 5 of the main serving cell are set up as DL sub-frames, and subframes 1 and 6 are set up as special subframes. G/H for the sub-serving cell may be transmitted to the UE from the base station through the subframes 0, 1, 5, and 6 of the main serving cell. In this case, subframes 0 and 5 of the main serving cell may instruct maximum 2 separate PUSCH transmission timing for the sub-serving cell, and each subframe 1 and 6 of the main serving cell may instruct maximum 3 different PUSCH timings for the sub-serving cell.

Particularly, the G/H(4) of subframe 0 in the main serving cell represents the PUSCH transmission timing to which subframe 0+4 of the sub-serving cell is corresponding, and the P(6) of subframe 4 in the sub-serving cell represents the PHICH reception timing to which subframe 4+6 of the main serving cell. The G/H(5) of subframe 0 in the main serving cell represents the PUSCH transmission timing to which subframe 0+5 of the sub-serving cell is corresponding, and the P(5) of subframe 5 in the sub-serving cell represents the PHICH reception timing to which subframe 5+5 of the main serving cell is corresponding.

The G/H(5) of subframe 1 in the main serving cell represents the PUSCH transmission timing to which subframe 1+5 of the sub-serving cell is corresponding, and the P(5) of subframe 6 in the sub-serving cell represents the PHICH reception timing to which subframe 6+5 of the main serving cell is corresponding. The G/H(6) of subframe 1 in the main serving cell represents the PUSCH transmission timing to which subframe 1+6 of the sub-serving cell is corresponding, and the P(4) of subframe 7 in the sub-serving cell represents the PHICH reception timing to which subframe 7+4 of the main serving cell is corresponding. The G/H(7) of subframe 1 in the main serving cell represents the PUSCH transmission timing to which subframe 1+7 of the sub-serving cell is corresponding, and the P(13) of subframe 8 in the sub-serving cell represents the PHICH reception timing to which subframe 8+13 of the main serving cell is corresponding.

The G/H(4) of subframe 5 in the main serving cell represents the PUSCH transmission timing to which subframe 5+4 of the sub-serving cell is corresponding, and the P(6) of subframe 9 in the sub-serving cell represents the PHICH reception timing to which subframe 9+6 of the main serving cell is corresponding. The G/H(5) of subframe 5 in the main serving cell represents the PUSCH transmission timing to which subframe 5+5 of the sub-serving cell is corresponding, and the P(5) of subframe 0 of the next radio frame in the sub-serving cell represents the PHICH reception timing to which subframe 0+5 of the next radio frame of the main serving cell is corresponding.

The G/H(5) of subframe 6 in the main serving cell represents the PUSCH transmission timing to which subframe 6+5 of the sub-serving cell is corresponding, and the P(5) of subframe 1 of the next radio frame in the sub-serving cell represents the PHICH reception timing to which subframe 1+5 of the next radio frame of the main serving cell is corresponding. The G/H(6) of subframe 6 in the main serving cell represents the PUSCH transmission timing to which subframe 6+6 of the sub-serving cell is corresponding, and the P(4) of subframe 2 of the next radio frame in the sub-serving cell represents the PHICH reception timing to which subframe 2+4 of the next radio frame of the main serving cell is corresponding. The G/H(7) of subframe 6 in the main serving cell represents the PUSCH transmission timing to which subframe 6+7 of the sub-serving cell is corresponding, and the P(13) of subframe 3 of the next radio frame in the sub-serving cell represents the PHICH reception timing to which subframe 3+13 of the next radio frame of the main serving cell is corresponding.

According to the above embodiment, for example, the followings (1) the PUSCH transmission timing for PHICH, (2) the PHICH transmission timing for the PUSCH transmission, (3) the PUSCH transmission timing for the UL grant and/or PHICH reception, are represented as below.

(1) The PUSCH Transmission Timing for PHICH

In case that the TDD UL/DL configuration is 0, and the PHICH is received from the resource which is corresponding to $I_{PHICH}=0$ in subframe i, associated PUSCH transmission is made from subframe i−k. Herein, the value k is as shown in Table 8 below.

TABLE 8

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 6 | 5 | | | | 6 | 5 | | |

Else, in case that the PHICH is received from the source which is corresponding to $I_{PHICH}=1$ in subframe i=0, associated PUSCH transmission is made from subframe i−5.

Else, in case that the PHICH is received from the source which is corresponding to $I_{PHICH}=1$ in subframe i=1, associated PUSCH transmission is made from subframe i−4.

Else, in case that the PHICH is received from the source which is corresponding to $I_{PHICH}=2$ in subframe i=1, associated PUSCH transmission is made from subframe i−13.

Else, in case that the PHICH is received from the source which is corresponding to $I_{PHICH}=1$ in subframe i=5, associated PUSCH transmission is made from subframe i−5.

Else, in case that the PHICH is received from the source which is corresponding to $I_{PHICH}=1$ in subframe i=6, associated PUSCH transmission is made from subframe i−4.

Else, in case that the PHICH is received from the source which is corresponding to $I_{PHICH}=2$ in subframe i=6, associated PUSCH transmission is made from subframe i−13.

(2) The PHICH Transmission Timing for the PUSCH Transmission

The PHICH transmission timing which is corresponding to the PUSCH transmission in subframe n is $n+k_{PHICH}$. Herein, the value $k_{PHICH}$ is as shown in Table 9 below.

TABLE 9

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | 5 | 5 | 4 | 13 | 6 | 5 | 5 | 4 | 13 | 6 |

(3) The PUSCH Transmission Timing for the UL Grant and/or PHICH Reception

When the TDD UL/DL configuration of scheduling cell is 0 and operated in normal HARQ, in case that the PDCCH/EPDCCH and/or PHICH transmission having the UL grant (uplink DCI format) for the corresponding UE is detected in subframe n, 1) if the MSB of UL index (3 bits) included in the PDCCH/EPDCCH having the UL grant is set to 1, or the PHICH is received from the resource that corresponds to $I_{PHICH}=0$ in subframe 0, 1, 5 or 6, the UE adjusts the corresponding PUSCH transmission to subframe n+k. In this case, the k value may follow Table 10 below.

TABLE 10

| TDD UL/DL Cofiguration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 5 | | | | 4 | 5 | | | |

2) If the LSB of UL index included in the PDCCH/EPDCCH having the UL grant is set to 1 and received in subframe 0, or the PHICH is received from the resource that corresponds to $I_{PHICH}=1$ in subframe 0, the UE adjusts the corresponding PUSCH transmission to subframe n+5. 3) If the LSB of UL index included in the PDCCH/EPDCCH having the UL grant is set to 1 and received in subframe 1, or the PHICH is received from the resource that corresponds to $I_{PHICH}=1$ in subframe 1, the UE adjusts the corresponding PUSCH transmission to subframe n+6. 4) If the remaining bit except the MSB and LSB of UL index included in the PDCCH/EPDCCH having the UL grant is set to 1 and received in subframe 1, or the PHICH is received from the resource that corresponds to $I_{PHICH}=2$ in subframe 1, the UE adjusts the corresponding PUSCH transmission to subframe n+7. 5) If the LSB of UL index included in the PDCCH/EPDCCH having the UL grant is set to 1 and received in subframe 5, or the PHICH is received from the resource that corresponds to $I_{PHICH}=1$ in subframe 5, the UE adjusts the corresponding PUSCH transmission to subframe n+5. 6) If the LSB of UL index included in the PDCCH/EPDCCH having the UL grant is set to 1 and received in subframe 6, or the PHICH is received from the resource that corresponds to $I_{PHICH}=1$ in subframe 6, the UE adjusts the corresponding PUSCH transmission to subframe n+6. 7) If the remaining bit of UL index included in the PDCCH/EPDCCH having the UL grant is set to 1 and received in subframe 6, or the PHICH is received from the resource that corresponds to $I_{PHICH}=2$ in subframe 6, the UE adjusts the corresponding PUSCH transmission to subframe n+7. 8) If the multiple bits of UL index (3 bits) included in the PDCCH/EPDCCH having the UL grant are set to 1 in subframe n at the same time, the corresponding PUSCH transmission is adjusted to be made from one of subframe n+k (here, referring to Table 10 for the value k), n+5, n+6 and n+7. In this case, when adjusting the corresponding PUSCH transmission to be made one out of subframes n+k, n+5, n+6 and n+7, the UE may perform it based on the above-described UL grant/PHICH receiving subframe number and the transmission timing of the PUSCH based on the UL index value.

Meanwhile, in this case, the value $I_{PHICH}$ may be determined based on the values within three timings (1), (2) and (3) above, for example, according to the following standards.

If the PUSCH is transmitted from subframe 0, 2, 5 or 7, the corresponding PHICH has $I_{PHICH}=1$.

If the PUSCH is transmitted from subframe 3 or 8, the corresponding PHICH has $I_{PHICH}=2$.

Else, the corresponding PHICH has $I_{PHICH}=0$.

The Second Embodiment

The second embodiment discloses a different timing method which is designed based on 10 ms HARQ cycle. That is, the second embodiment corresponds to an embodiment in which the timing is modified from the first embodiment.

FIG. 8 illustrates an example of the UL scheduling/HARQ timing according to the second embodiment for the case that the TDD UL/DL configuration of the scheduling cell is zero. FIG. 8 shows the case that the main serving cell is the scheduling cell configured with the TDD UL/DL configuration being 0 and the sub-serving cell is the scheduled cell configured with the FDD.

Referring to FIG. 8, sub-frames 0 and 5 of the main serving cell are set up as DL sub-frames, and subframes 1 and 6 are set up as special subframes. The G/H for the sub-serving cell may be transmitted to the UE from the base station through subframes 0, 1, 5 and 6 of the main serving cell. In this case, subframes 0 and 5 of the main serving cell may instruct maximum 3 separate PUSCH transmission timing for the sub-serving cell, and each subframe 1 and 6 of the main serving cell may instruct maximum 2 different PUSCH timings for the sub-serving cell.

Particularly, the G/H(4) of subframe 0 in the main serving cell represents the PUSCH transmission timing to which subframe 0+4 of the sub-serving cell is corresponding, and the P(6) of subframe 4 in the sub-serving cell represents the PHICH reception timing to which subframe 4+6 of the main serving cell is corresponding. The G/H(5) of subframe 0 in the main serving cell represents the PUSCH transmission timing to which subframe 0+5 of the sub-serving cell is corresponding, and the P(5) of subframe 5 in the sub-serving cell represents the PHICH reception timing to which subframe 5+5 of the main serving cell is corresponding. The G/H(6) of subframe 0 in the main serving cell represents the PUSCH transmission timing to which subframe 0+6 of the sub-serving cell is corresponding, and the P(4) of subframe 6 in the sub-serving cell represents the PHICH reception timing to which subframe 6+4 of the main serving cell is corresponding.

The G/H(6) of subframe 1 in the main serving cell represents the PUSCH transmission timing to which subframe 1+6 of the sub-serving cell is corresponding, and the P(4) of subframe 7 in the sub-serving cell represents the PHICH reception timing to which subframe 7+4 of the main serving cell is corresponding. The G/H(7) of subframe 1 in the main serving cell represents the PUSCH transmission timing to which subframe 1+7 of the sub-serving cell is corresponding, and the P(13) of subframe 8 in the sub-serving cell represents the PHICH reception timing to which subframe 8+13 of the main serving cell is corresponding.

The G/H(4) of subframe 5 in the main serving cell represents the PUSCH transmission timing to which subframe 5+4 of the sub-serving cell is corresponding, and the P(6) of subframe 9 in the sub-serving cell represents the PHICH reception timing to which subframe 9+6 of the main serving cell is corresponding. The G/H(5) of subframe 5 in the main serving cell represents the PUSCH transmission timing to which subframe 5+5 of the sub-serving cell is corresponding, and the P(5) of subframe 0 of the next radio frame in the sub-serving cell represents the PHICH reception timing to which subframe 0+5 of the next radio frame of the main serving cell is corresponding. The G/H(6) of subframe 5 in the main serving cell represents the PUSCH transmission timing to which subframe 5+6 of the sub-serving cell is corresponding, and the P(4) of subframe 1 of the next radio frame in the sub-serving cell represents the PHICH reception timing to which subframe 1+4 of the next radio frame of the main serving cell is corresponding.

The G/H(6) of subframe 6 in the main serving cell represents the PUSCH transmission timing to which subframe 6+6 of the sub-serving cell is corresponding, and the P(4) of subframe 2 of the next radio frame in the sub-serving cell represents the PHICH reception timing to which subframe 2+4 of the next radio frame of the main serving cell is corresponding. The G/H(7) of subframe 6 in the main serving cell represents the PUSCH transmission timing to which subframe 6+7 of the sub-serving cell is corresponding, and the P(13) of subframe 3 of the next radio frame in the sub-serving cell represents the PHICH reception timing to which subframe 3+13 of the next radio frame of the main serving cell is corresponding.

According to the above embodiment, for example, the followings (1) the PUSCH transmission timing for PHICH, (2) the PHICH transmission timing for the PUSCH transmission, (3) the PUSCH transmission timing for the UL grant and/or PHICH reception, are represented as below.

(1) The PUSCH Transmission Timing for PHICH

In case that the TDD UL/DL configuration is 0, and the PHICH is received from the resource which is corresponding to $I_{PHICH}=0$ in subframe i, associated PUSCH transmission is made from subframe i−k. Herein, the value k is as shown in Table 11 below.

TABLE 11

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 6 | 4 | | | | 6 | 4 | | | |

Else, in case that the PHICH is received from the source which is corresponding to $I_{PHICH}=1$ in subframe i=0, associated PUSCH transmission is made from subframe i−5.

Else, in case that the PHICH is received from the source which is corresponding to $I_{PHICH}=2$ in subframe i=0, associated PUSCH transmission is made from subframe i−4.

Else, in case that the PHICH is received from the source which is corresponding to $I_{PHICH}=1$ in subframe i=1, associated PUSCH transmission is made from subframe i−13.

Else, in case that the PHICH is received from the source which is corresponding to $I_{PHICH}=1$ in subframe i=5, associated PUSCH transmission is made from subframe i−5.

Else, in case that the PHICH is received from the source which is corresponding to $I_{PHICH}=2$ in subframe i=5, associated PUSCH transmission is made from subframe i−4.

Else, in case that the PHICH is received from the source which is corresponding to $I_{PHICH}=1$ in subframe i=6, associated PUSCH transmission is made from subframe i−13.

(2) The PHICH Transmission Timing for the PUSCH Transmission

The PHICH transmission timing which is corresponding to the PUSCH transmission in subframe n is $n+k_{PHICH}$. Herein, the value $k_{PHICH}$ is as shown in Table 12 below.

TABLE 12

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | 5 | 4 | 4 | 13 | 6 | 5 | 4 | 4 | 13 | 6 |

(3) The PUSCH Transmission Timing for the UL Grant and/or PHICH Reception

When the TDD UL/DL configuration of scheduling cell is 0 and operated in normal HARQ, in case that the PDCCH/EPDCCH and/or PHICH transmission having the UL grant (uplink DCI format) for the corresponding UE is detected in subframe n, 1) if the MSB of UL index (3 bits) included in the PDCCH/EPDCCH having the UL grant is set to 1, or the PHICH is received from the resource that corresponds to $I_{PHICH}=0$ in subframe 0, 1, 5 or 6, the UE adjusts the corresponding PUSCH transmission to subframe n+k. In this case, the value k may follow Table 13 below.

TABLE 13

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |

2) If the LSB of UL index included in the PDCCH/EPDCCH having the UL grant is set to 1 and received in subframe 0, or the PHICH is received from the resource that corresponds to $I_{PHICH}=1$ in subframe 0, the UE adjusts the corresponding PUSCH transmission to subframe n+5. 3) If the remaining bit except the MSB and LSB of UL index included in the PDCCH/EPDCCH having the UL grant is set to 1 and received in subframe 0, or the PHICH is received from the resource that corresponds to $I_{PHICH}=2$ in subframe 0, the UE adjusts the corresponding PUSCH transmission to subframe n+6. 4) If the LSB of UL index included in the PDCCH/EPDCCH having the UL grant is set to 1 and received in subframe 1, or the PHICH is received from the resource that corresponds to $I_{PHICH}=1$ in subframe 1, the UE adjusts the corresponding PUSCH transmission to subframe n+7. 5) If the LSB of UL index included in the PDCCH/EPDCCH having the UL grant is set to 1 and received in subframe 5, or the PHICH is received from the resource that corresponds to $I_{PHICH}=1$ in subframe 5, the UE adjusts the corresponding PUSCH transmission to subframe n+5. 6) If the remaining bit of UL index included in the PDCCH/

EPDCCH having the UL grant is set to 1 and received in subframe 5, or the PHICH is received from the resource that corresponds to $I_{PHICH}=2$ in subframe 5, the UE adjusts the corresponding PUSCH transmission to subframe n+6. 7) If the LSB of UL index included in the PDCCH/EPDCCH having the UL grant is set to 1 and received in subframe 6, or the PHICH is received from the resource that corresponds to $I_{PHICH}=1$ in subframe 6, the UE adjusts the corresponding PUSCH transmission to subframe n+7. 8) If the multiple bits of UL index (3 bits) included in the PDCCH/EPDCCH having the UL grant are set to 1 in subframe n at the same time, the corresponding PUSCH transmission is adjusted to be made one out of subframes n+k (here, referring to Table 13 for k), n+5, n+6 and n+7. In this case, when adjusting the corresponding PUSCH transmission to be made one out of subframes n+k, n+5, n+6 and n+7, the UE may perform it based on the above-described UL grant/PHICH receiving subframe number and the transmission timing of the PUSCH based on the UL index value.

Meanwhile, in this case, the value $I_{PHICH}$ may be determined based on the values within three timings (1), (2) and (3) above, for example, according to the following standards.

If the PUSCH is transmitted from subframe 0, 2, 5 or 8, the corresponding PHICH has $I_{PHICH}=1$.

If the PUSCH is transmitted from subframe 1 or 6, the corresponding PHICH has $I_{PHICH}=2$.

Else, the corresponding PHICH has $I_{PHICH}=0$.

2. TDD UL/DL configuration 1 (scheduling cell)–FDD (scheduled cell) CA

In case of CA among TDD cells, except for the case that the TDD UL/DL configurations for all serving cells are zero and the UL reference UL/DL configuration is zero, the PUSCH transmission for only one UL subframe is scheduled on all DL subframes. However, in case that the CA of TDD cell and FDD cell is configured to UE and the cross carrier scheduling by setting the TDD cell to the scheduling cell is configured, the UL grant and/or PHICH transmission for the multiple (2 or more) UL subframes from one DL subframe of the scheduling cell is required for scheduling all UL subframes in the scheduled cell (FDD cell). This is because the UL subframe for the UL grant and PHICH transmission does not exist in all subframes in the scheduling cell (TDD cell). This is the same as the case that the scheduling cell has other TDD UL/DL configurations as well as the TDD UL/DL configuration is 1. As described above, in case that the UL grant and/or PHICH for the multiple (2 or more) UL subframes of the scheduled cell is transmitted from one DL subframe of the scheduling cell, an additional identifier is required.

The scheduling cell of the TDD UL/DL configuration 1 may perform downlink transmission from subframe 0, 1, 4, 5, 6 and 9. According to an embodiment of the present invention, for the scheduled cell, from at least 4 subframe of the scheduling cell, maximum 2 PUSCH transmission timings may be indicated respectively. An embodiment of the present invention is the case of maintaining 10 ms synchronous HARQ cycle. That is, in the aspect of each HARQ process, the UL HARQ is operated based on 10 ms cycle.

FIG. 9 illustrates an example of the UL scheduling/HARQ timing according to the embodiment for the case that the TDD UL/DL configuration of the scheduling cell is 1. FIG. 9 shows the case that the main serving cell is the scheduling cell configured with the TDD UL/DL configuration being 1 and the sub-serving cell is the scheduled cell configured with the FDD.

Referring to FIG. 9, sub-frames 0, 4, 5 and 9 of the main serving cell are set up as DL sub-frames, and subframes 1 and 6 are set up as special subframes. The G/H for the sub-serving cell may be transmitted to the UE from the base station through subframes 0, 1, 4, 5, 6 and 9 of the main serving cell. In this case, each of subframes 0, 1, 5, and 6 of the main serving cell may instruct maximum 2 separate PUSCH transmission timing for the sub-serving cell, and each subframe 4 and 9 of the main serving cell may instruct maximum 1 PUSCH timing for the sub-serving cell.

Particularly, the G/H(4) of subframe 0 in the main serving cell represents the PUSCH transmission timing to which subframe 0+4 of the sub-serving cell is corresponding, and the P(6) of subframe 4 in the sub-serving cell represents the PHICH reception timing to which subframe 4+6 of the main serving cell is corresponding. The G/H(5) of subframe 0 in the main serving cell represents the PUSCH transmission timing to which subframe 0+5 of the sub-serving cell is corresponding, and the P(5) of subframe 5 in the sub-serving cell represents the PHICH reception timing to which subframe 5+5 of the main serving cell is corresponding.

The G/H(5) of subframe 1 in the main serving cell represents the PUSCH transmission timing to which subframe 1+5 of the sub-serving cell is corresponding, and the P(5) of subframe 6 in the sub-serving cell represents the PHICH reception timing to which subframe 6+5 of the main serving cell is corresponding. The G/H(6) of subframe 1 in the main serving cell represents the PUSCH transmission timing to which subframe 1+6 of the sub-serving cell is corresponding, and the P(4) of subframe 7 in the sub-serving cell represents the PHICH reception timing to which subframe 7+4 of the main serving cell is corresponding.

The G/H(4) of subframe 4 in the main serving cell represents the PUSCH transmission timing to which subframe 4+4 of the sub-serving cell is corresponding, and the P(6) of subframe 8 in the sub-serving cell represents the PHICH reception timing to which subframe 8+6 of the main serving cell is corresponding.

The G/H(4) of subframe 5 in the main serving cell represents the PUSCH transmission timing to which subframe 5+4 of the sub-serving cell is corresponding, and the P(6) of subframe 9 of the next radio frame in the sub-serving cell represents the PHICH reception timing to which subframe 9+6 of the next radio frame of the main serving cell is corresponding. The G/H(5) of subframe 5 in the main serving cell represents the PUSCH transmission timing to which subframe 5+5 of the sub-serving cell is corresponding, and the P(5) of subframe 0 of the next radio frame in the sub-serving cell represents the PHICH reception timing to which subframe 0+5 of the next radio frame of the main serving cell is corresponding.

The G/H(5) of subframe 6 in the main serving cell represents the PUSCH transmission timing to which subframe 6+5 of the sub-serving cell is corresponding, and the P(5) of subframe 1 of the next radio frame in the sub-serving cell represents the PHICH reception timing to which subframe 1+5 of the next radio frame of the main serving cell is corresponding. The G/H(6) of subframe 6 in the main serving cell represents the PUSCH transmission timing to which subframe 6+6 of the sub-serving cell is corresponding, and the P(4) of subframe 2 of the next radio frame in the sub-serving cell represents the PHICH reception timing to which subframe 2+4 of the next radio frame of the main serving cell is corresponding.

The G/H(4) of subframe 9 in the main serving cell represents the PUSCH transmission timing to which subframe 9+4 of the sub-serving cell is corresponding, and the P(6) of subframe 3 of the next radio frame in the sub-serving cell represents the PHICH reception timing to which subframe 3+6 of the next radio frame of the main serving cell is corresponding.

For example, as follow is to explain based on P(6) which is transmitted from subframe 8 of the sub-serving cell. The reception timing of PHICH corresponding to P(6) is subframe 8+6 of the main serving cell, the G/H (4) is received for retransmission from subframe 4 of the next radio frame of the main serving cell, and the PUSCH retransmission timing is subframe 4+4 (=8) of the next radio frame. A subframe is 1 ms and consequently, HARQ cycle is 10 ms.

According to the above embodiment, for example, the followings (1) the PUSCH transmission timing for PHICH, (2) the PHICH transmission timing for the PUSCH transmission, (3) the PUSCH transmission timing for the UL grant and/or PHICH reception, are represented as below.

(1) The PUSCH Transmission Timing for PHICH

In case that the TDD UL/DL configuration is 1, and the PHICH is received from the resource which is corresponding to $I_{PHICH}=0$ in subframe i, associated PUSCH transmission is made from subframe i−k. Herein, the value k is as shown in Table 14 below.

TABLE 14

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 1 | | 6 | 5 | | | | 6 | 6 | 5 | | 6 |

Else, in case that the PHICH is received from the source which is corresponding to $I_{PHICH}=1$ in subframe i=0, associated PUSCH transmission is made from subframe i−5.

Else, in case that the PHICH is received from the source which is corresponding to $I_{PHICH}=1$ in subframe i=1, associated PUSCH transmission is made from subframe i−4.

Else, in case that the PHICH is received from the source which is corresponding to $I_{PHICH}=1$ in subframe i=5, associated PUSCH transmission is made from subframe i−5.

Else, in case that the PHICH is received from the source which is corresponding to $I_{PHICH}=1$ in subframe i=6, associated PUSCH transmission is made from subframe i−4.

(2) The PHICH Transmission Timing for the PUSCH Transmission

The PHICH transmission timing which is corresponding to the PUSCH transmission in subframe n is $n+k_{PHICH}$. Herein, the value $k_{PHICH}$ is as shown in Table 15 below.

TABLE 15

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 1 | | 5 | 5 | 4 | 6 | 6 | 5 | 5 | 4 | 6 | 6 |

(3) The PUSCH Transmission Timing for the UL Grant and/or PHICH Reception

When the TDD UL/DL configuration of scheduling cell is 1 and operated in normal HARQ, in case that the PDCCH/EPDCCH and/or PHICH transmission having the UL grant (uplink DCI format) for the corresponding UE is detected in subframe n, 1) if the MSB of UL index (2 bits) included in the PDCCH/EPDCCH having the UL grant is set to 1, or the PHICH is received from the resource that corresponds to $I_{PHICH}=0$ in subframe 0, 1, 4, 5, 6 or 9, the UE adjusts the corresponding PUSCH transmission to subframe n+k. In this case, the value k may follow Table 16 below.

TABLE 16

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 1 | | 4 | 5 | | | 4 | 4 | 5 | | | 4 |

2) If the LSB of UL index included in the PDCCH/EPDCCH having the UL grant is set to 1 and received in subframe 0, or the PHICH is received from the resource that corresponds to $I_{PHICH}=1$ in subframe 0, the UE adjusts the corresponding PUSCH transmission to subframe n+5. 3) If the LSB of UL index included in the PDCCH/EPDCCH having the UL grant is set to 1 and received in subframe 1, or the PHICH is received from the resource that corresponds to $I_{PHICH}=1$ in subframe 1, the UE adjusts the corresponding PUSCH transmission to subframe n+6. 4) If the LSB of UL index included in the PDCCH/EPDCCH having the UL grant is set to 1 and received in subframe 5, or the PHICH is received from the resource that corresponds to $I_{PHICH}=1$ in subframe 5, the UE adjusts the corresponding PUSCH transmission to subframe n+5. 5) If the LSB of UL index included in the PDCCH/EPDCCH having the UL grant is set to 1 and received in subframe 6, or the PHICH is received from the resource that corresponds to $I_{PHICH}=1$ in subframe 6, the UE adjusts the corresponding PUSCH transmission to subframe n+6. 6) If the both of MSB and LSB of the UL index included in the PDCCH/EPDCCH having the UL grant is set to 1 in subframe n, corresponding PUSCH transmission is adjusted to be made from one of n+k (here, referring to Table 16 for k), n+5, n+6. In this case, when adjusting the corresponding PUSCH transmission to be made from one of subframe n+k, n+5, and n+6, the UE may perform it based on the above-described UL grant/PHICH receiving subframe number and the transmission timing of the PUSCH based on the UL index value.

Meanwhile, in this case, the value $I_{PHICH}$, for another example, may be determined according to the following standards.

If the PUSCH is transmitted from subframe 0, 2, 5 or 7, the corresponding PHICH has $I_{PHICH}=1$.

Else, the corresponding PHICH has $I_{PHICH}=0$.

3. TDD UL/DL configuration 2 (scheduling cell)–FDD (scheduled cell) CA

The scheduling cell of the TDD UL/DL configuration 2 may perform downlink transmission from subframes 0, 1, 3, 4, 5, 6, 8 and 9. According to an embodiment of the present invention, for the scheduled cell, from at least 2 subframes (for example, subframes 1 and 6) of the scheduling cell, maximum 2 PUSCH transmission timings may be instructed respectively. An embodiment of the present invention is the case of maintaining 10 ms synchronous HARQ cycle. That is, in the aspect of each HARQ process, the UL HARQ is operated based on 10 ms cycle.

FIG. 10 illustrates an example of the UL scheduling/HARQ timing according to the embodiment for the case that the TDD UL/DL configuration of the scheduling cell is 2. FIG. 10 shows the case that the main serving cell is the scheduling cell configured with the TDD UL/DL configuration being 2 and the sub-serving cell is the scheduled cell configured with the FDD.

Referring to FIG. 10, sub-frames 0, 3, 4, 5, 8 and 9 of the main serving cell are set up as DL sub-frames, and subframes 1 and 6 are set up as special subframes. The G/H for the sub-serving cell may be transmitted to the UE from the base station through subframes 0, 1, 3, 4, 5, 6, 8 and 9 of the main serving cell. In this case, each of subframes 1 and 6 of the main serving cell may instruct maximum 2 separate PUSCH transmission timing for the sub-serving cell, and each of subframes 0, 3, 4, 5, 8 and 9 of the main serving cell may instruct maximum 1 PUSCH transmission timing for the sub-serving cell.

Particularly, the G/H(4) of subframe 0 in the main serving cell represents the PUSCH transmission timing to which subframe 0+4 of the sub-serving cell is corresponding, and the P(6) of subframe 4 in the sub-serving cell represents the PHICH reception timing to which subframe 4+6 of the main serving cell is corresponding.

The G/H(4) of subframe 1 in the main serving cell represents the PUSCH transmission timing to which subframe 1+4 of the sub-serving cell is corresponding, and the P(6) of subframe 5 in the sub-serving cell represents the PHICH reception timing to which subframe 5+6 of the main serving cell is corresponding. The G/H(5) of subframe 1 in the main serving cell represents the PUSCH transmission timing to which subframe 1+5 of the sub-serving cell is corresponding, and the P(5) of subframe 6 in the sub-serving cell represents the PHICH reception timing to which subframe 6+5 of the main serving cell is corresponding.

The G/H(4) of subframe 3 in the main serving cell represents the PUSCH transmission timing to which subframe 3+4 of the sub-serving cell is corresponding, and the P(6) of subframe 7 in the sub-serving cell represents the PHICH reception timing to which subframe 7+6 of the main serving cell is corresponding.

The G/H(4) of subframe 4 in the main serving cell represents the PUSCH transmission timing to which subframe 4+4 of the sub-serving cell is corresponding, and the P(6) of subframe 8 in the sub-serving cell represents the PHICH reception timing to which subframe 8+6 of the main serving cell is corresponding.

The G/H(4) of subframe 5 in the main serving cell represents the PUSCH transmission timing to which subframe 5+4 of the sub-serving cell is corresponding, and the P(6) of subframe 9 in the sub-serving cell represents the PHICH reception timing to which subframe 9+6 of the main serving cell is corresponding.

The G/H(4) of subframe 6 in the main serving cell represents the PUSCH transmission timing to which subframe 6+4 of the sub-serving cell is corresponding, and the P(6) of subframe 0 of the next radio frame in the sub-serving cell represents the PHICH reception timing to which subframe 0+6 of the next radio frame of the main serving cell is corresponding. The G/H(5) of subframe 6 in the main serving cell represents the PUSCH transmission timing to which subframe 6+5 of the sub-serving cell is corresponding, and the P(5) of subframe 1 of the next radio frame in the sub-serving cell represents the PHICH reception timing to which subframe 1+5 of the next radio frame of the main serving cell is corresponding.

The G/H(4) of subframe 8 in the main serving cell represents the PUSCH transmission timing to which subframe 8+4 of the sub-serving cell is corresponding, and the P(6) of subframe 2 of the next radio frame in the sub-serving cell represents the PHICH reception timing to which subframe 2+6 of the next radio frame of the main serving cell is corresponding.

The G/H(4) of subframe 9 in the main serving cell represents the PUSCH transmission timing to which subframe 9+4 of the sub-serving cell is corresponding, and the P(6) of subframe 3 of the next radio frame in the sub-serving cell represents the PHICH reception timing to which subframe 3+6 of the next radio frame of the main serving cell is corresponding.

Particular examples according to the above embodiment, the followings (1) the PUSCH transmission timing for PHICH, (2) the PHICH transmission timing for the PUSCH transmission, (3) the PUSCH transmission timing for the UL grant and/or PHICH reception, are represented as below.

(1) The PUSCH Transmission Timing for PHICH

In case that the TDD UL/DL configuration is 2, and the PHICH is received from the resource which is corresponding to $I_{PHICH}=0$ in subframe i, associated PUSCH transmission is made from subframe i−k. Herein, the value k is as shown in Table 17 below.

TABLE 17

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 2 | 6 | 6 | | 6 | 6 | 6 | 6 | | 6 | 6 |

Else, in case that the PHICH is received from the source which is corresponding to $I_{PHICH}=1$ in subframe i=1, associated PUSCH transmission is made from subframe i−5.

Else, in case that the PHICH is received from the source which is corresponding to $I_{PHICH}=1$ in subframe i=6, associated PUSCH transmission is made from subframe i−5.

(2) The PHICH Transmission Timing for the PUSCH Transmission

The PHICH transmission timing which is corresponding to the PUSCH transmission in subframe n is $n+k_{PHICH}$. Herein, the value $k_{PHICH}$ is as shown in Table 18 below.

TABLE 18

| TDD UL/DL | subframe index n | | | | | | | | | |
|---|---|---|---|---|---|---|---|---|---|---|
| Configuration | 0 | 1 | 2 | 3 | 4 | 5 | 6 | 7 | 8 | 9 |
| 2 | 6 | 5 | 6 | 6 | 6 | 6 | 5 | 6 | 6 | 6 |

(3) The PUSCH Transmission Timing for the UL Grant and/or PHICH Reception

When the TDD UL/DL configuration of scheduling cell is 2 and operated in normal HARQ, in case that the PDCCH/EPDCCH and/or PHICH transmission having the UL grant (uplink DCI format) for the corresponding UE is detected in subframe n, 1) if the MSB of UL index (2 bits) included in the PDCCH/EPDCCH having the UL grant is set to 1, or the PHICH is received from the resource that corresponds to $I_{PHICH}=0$ in subframe 0, 1, 3, 4, 5, 6, 8 or 9, the UE adjusts the corresponding PUSCH transmission to subframe n+k. In this case, the value k may follow Table 19 below.

TABLE 19

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 2 | 4 | 4 | | 4 | 4 | 4 | 4 | | 4 | 4 |

2) If the LSB of UL index included in the PDCCH/EPDCCH having the UL grant is set to 1 and received in subframe 1, or the PHICH is received from the resource that corresponds to $I_{PHICH}=1$ in subframe 1, the UE adjusts the corresponding PUSCH transmission to subframe n+5. 3) If the LSB of UL index included in the PDCCH/EPDCCH having the UL grant is set to 1 and received in subframe 6, or the PHICH is received from the resource that corresponds to $I_{PHICH}=1$ in subframe 6, the UE adjusts the corresponding PUSCH transmission to subframe n+5. 4) If the both of MSB and LSB of UL index included in the PDCCH/EPDCCH having the UL grant is set to 1 and received in subframe n, the corresponding PUSCH transmission is adjusted to subframe n+k (here, referring to Table 19 for k), n+5. In this case, when adjusting the corresponding PUSCH transmission to be made from one of subframe n+k and n+5, the UE may perform it based on the above-described UL grant/PHICH receiving subframe number and the transmission timing of the PUSCH based on the UL index value.

Meanwhile, in this case, the value $I_{PHICH}$, for another example, may be determined according to the following standards.

If the PUSCH is transmitted from subframe 1 or 6, the corresponding PHICH has $I_{PHICH}=1$.

Else, the corresponding PHICH has $I_{PHICH}=0$.

4. TDD UL/DL configuration 3 (scheduling cell)–FDD (scheduled cell) CA

The scheduling cell of the TDD UL/DL configuration 3 may perform downlink transmission from subframes 0, 1, 5, 6, 7, 8 and 9. According to an embodiment of the present invention, for the scheduled cell, from at least 3 subframes (for example, subframes 0, 1 and 9) of the scheduling cell, maximum 2 PUSCH transmission timings may be instructed respectively. An embodiment of the present invention is the case of maintaining 10 ms synchronous HARQ cycle. That is, in the aspect of each HARQ process, the UL HARQ is operated based on 10 ms cycle.

FIG. 11 illustrates an example of the UL scheduling/HARQ timing according to the embodiment for the case that the TDD UL/DL configuration of the scheduling cell is 3. FIG. 11 shows the case that the main serving cell is the scheduling cell configured with the TDD UL/DL configuration being 3 and the sub-serving cell is the scheduled cell configured with the FDD.

Referring to FIG. 11, sub-frames 0, 5, 6, 7, 8 and 9 of the main serving cell are set up as DL sub-frames, and subframe 1 is set up as a special subframe. The G/H for the sub-serving cell may be transmitted to the UE from the base station through subframes 0, 1, 5, 6, 7, 8 and 9 of the main serving cell. In this case, each of subframes 0, 1 and 9 of the main serving cell may instruct maximum 2 separate PUSCH transmission timing for the sub-serving cell, and each of subframes 5, 6, 7 and 8 of the main serving cell may instruct maximum 1 PUSCH transmission timing for the sub-serving cell.

Particularly, the G/H(4) of subframe 0 in the main serving cell represents the PUSCH transmission timing to which subframe 0+4 of the sub-serving cell is corresponding, and the P(6) of subframe 4 in the sub-serving cell represents the PHICH reception timing to which subframe 4+6 of the main serving cell is corresponding. The G/H(6) of subframe 0 in the main serving cell represents the PUSCH transmission timing to which subframe 0+6 of the sub-serving cell is corresponding, and the P(4) of subframe 6 in the sub-serving cell represents the PHICH reception timing to which subframe 6+4 of the main serving cell is corresponding.

The G/H(6) of subframe 1 in the main serving cell represents the PUSCH transmission timing to which subframe 1+6 of the sub-serving cell is corresponding, and the P(4) of subframe 7 in the sub-serving cell represents the PHICH reception timing to which subframe 7+4 of the main serving cell is corresponding. The G/H(7) of subframe 1 in the main serving cell represents the PUSCH transmission timing to which subframe 1+7 of the sub-serving cell is corresponding, and the P(13) of subframe 8 in the sub-serving cell represents the PHICH reception timing to which subframe 8+13 of the main serving cell is corresponding.

The G/H(4) of subframe 5 in the main serving cell represents the PUSCH transmission timing to which subframe 5+4 of the sub-serving cell is corresponding, and the P(6) of subframe 9 in the sub-serving cell represents the PHICH reception timing to which subframe 9+6 of the main serving cell is corresponding.

The G/H(4) of subframe 6 in the main serving cell represents the PUSCH transmission timing to which subframe 6+4 of the sub-serving cell is corresponding, and the P(6) of subframe 0 of the next radio frame in the sub-serving cell represents the PHICH reception timing to which subframe 0+6 of the next radio frame of the main serving cell is corresponding.

The G/H(4) of subframe 7 in the main serving cell represents the PUSCH transmission timing to which subframe 7+4 of the sub-serving cell is corresponding, and the P(6) of subframe 1 of the next radio frame in the sub-serving cell represents the PHICH reception timing to which subframe 1+6 of the next radio frame of the main serving cell is corresponding.

The G/H(4) of subframe 8 in the main serving cell represents the PUSCH transmission timing to which subframe 8+4 of the sub-serving cell is corresponding, and the P(6) of subframe 2 of the next radio frame in the sub-serving cell represents the PHICH reception timing to which subframe 2+6 of the next radio frame of the main serving cell is corresponding.

The G/H(4) of subframe 9 in the main serving cell represents the PUSCH transmission timing to which subframe 9+4 of the sub-serving cell is corresponding, and the P(6) of subframe 3 of the next radio frame in the sub-serving cell represents the PHICH reception timing to which subframe 3+6 of the next radio frame of the main serving cell is corresponding. The G/H(6) of subframe 9 in the main serving cell represents the PUSCH transmission timing to which subframe 9+6 of the sub-serving cell is corresponding, and the P(4) of subframe 5 of the next radio frame in the sub-serving cell represents the PHICH reception timing to which subframe 5+4 of the next radio frame of the main serving cell is corresponding.

According to the above embodiment, for example, the followings (1) the PUSCH transmission timing for PHICH, (2) the PHICH transmission timing for the PUSCH transmission, (3) the PUSCH transmission timing for the UL grant and/or PHICH reception, are represented as below.

(1) The PUSCH Transmission Timing for PHICH

In case that the TDD UL/DL configuration is 3, and the PHICH is received from the resource which is corresponding to $I_{PHICH}=0$ in subframe i, associated PUSCH transmission is made from subframe i−k. Herein, the value k is as shown in Table 20 below.

TABLE 20

| TDD UL/DL | subframe number 1 | | | | | | | | | |
|---|---|---|---|---|---|---|---|---|---|---|
| Configuration | 0 | 1 | 2 | 3 | 4 | 5 | 6 | 7 | 8 | 9 |
| 3 | 6 | 4 | | | | 6 | 6 | 6 | 6 | 6 |

Else, in case that the PHICH is received from the source which is corresponding to $I_{PHICH}=1$ in subframe i=0, associated PUSCH transmission is made from subframe i−4.

Else, in case that the PHICH is received from the source which is corresponding to $I_{PHICH}=1$ in subframe i=1, associated PUSCH transmission is made from subframe i−13.

Else, in case that the PHICH is received from the source which is corresponding to $I_{PHICH}=1$ in subframe i=9, associated PUSCH transmission is made from subframe i−4.

(2) The PHICH Transmission Timing for the PUSCH Transmission

The PHICH transmission timing which is corresponding to the PUSCH transmission in subframe n is $n+k_{PHICH}$. Herein, the value $k_{PHICH}$ is as shown in Table 21 below.

TABLE 21

| TDD UL/DL | subframe index n | | | | | | | | | |
|---|---|---|---|---|---|---|---|---|---|---|
| Configuration | 0 | 1 | 2 | 3 | 4 | 5 | 6 | 7 | 8 | 9 |
| 3 | | 6 | 6 | 6 | 6 | 6 | 4 | 4 | 4 | 13 | 6 |

(3) The PUSCH Transmission Timing for the UL Grant and/or PHICH Reception

When the TDD UL/DL configuration of scheduling cell is 3 and operated in normal HARQ, in case that the PDCCH/EPDCCH and/or PHICH transmission having the UL grant (uplink DCI format) for the corresponding UE is detected in subframe n, 1) if the MSB of UL index (2 bits) included in the PDCCH/EPDCCH having the UL grant is set to 1, or the PHICH is received from the resource that corresponds to $I_{PHICH}=0$ in subframe 0, 1, 5, 6, 7, 8 or 9, the UE adjusts the corresponding PUSCH transmission to subframe n+k. In this case, the value k may follow Table 22 below.

TABLE 22

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 3 | 4 | 6 | | | | 4 | 4 | 4 | 4 | 4 |

2) If the LSB of UL index included in the PDCCH/EPDCCH having the UL grant is set to 1 and received in subframe 0, or the PHICH is received from the resource that corresponds to $I_{PHICH}=1$ in subframe 0, the UE adjusts the corresponding PUSCH transmission to subframe n+6. 3) If the LSB of UL index included in the PDCCH/EPDCCH having the UL grant is set to 1 and received in subframe 1, or the PHICH is received from the resource that corresponds to $I_{PHICH}=1$ in subframe 1, the UE adjusts the corresponding PUSCH transmission to subframe n+7. 4) If the LSB of UL index included in the PDCCH/EPDCCH having the UL grant is set to 1 and received in subframe 9, or the PHICH is received from the resource that corresponds to $I_{PHICH}=1$ in subframe 9, the UE adjusts the corresponding PUSCH transmission to subframe n+6. 5) If the both of MSB and LSB of UL index included in the PDCCH/EPDCCH having the UL grant is set to 1 and received in subframe n, the corresponding PUSCH transmission is adjusted to be made one out of subframes n+k (here, referring to Table 22 for k), n+6 and n+7. In this case, when adjusting the corresponding PUSCH transmission to be made from one of subframe n+k, n+6 and n+7, the UE may perform it based on the above-described UL grant/PHICH receiving subframe number and the transmission timing of the PUSCH based on the UL index value.

Meanwhile, in this case, the value $I_{PHICH}$, for another example, may be determined according to the following standards.

If the PUSCH is transmitted from subframe 5, 6 or 8, the corresponding PHICH has $I_{PHICH}=1$.

Else, the corresponding PHICH has $I_{PHICH}=0$.

5. TDD UL/DL configuration 4 (scheduling cell)–FDD (scheduled cell) CA

The scheduling cell of the TDD UL/DL configuration 4 may perform downlink transmission from subframes 0, 1, 4, 5, 6, 7, 8 and 9. According to an embodiment of the present invention, for the scheduled cell, from at least 2 subframes (for example, subframes 0 and 1) of the scheduling cell, maximum 2 PUSCH transmission timings may be instructed respectively. An embodiment of the present invention is the case of maintaining 10 ms synchronous HARQ cycle. That is, in the aspect of each HARQ process, the UL HARQ is operated based on 10 ms cycle.

FIG. 12 illustrates an example of the UL scheduling/HARQ timing according to the embodiment for the case that the TDD UL/DL configuration of the scheduling cell is 4. FIG. 12 shows the case that the main serving cell is the scheduling cell configured with the TDD UL/DL configuration being 4 and the sub-serving cell is the scheduled cell configured with the FDD.

Referring to FIG. 12, sub-frames 0, 4, 5, 6, 7, 8 and 9 of the main serving cell are set up as DL sub-frames, and subframe 1 is set up as a special subframe. The G/H for the sub-serving cell may be transmitted to the UE from the base station through subframes 0, 1, 4, 5, 6, 7, 8 and 9 of the main serving cell. In this case, each of subframes 0 and 1 of the main serving cell may instruct maximum 2 separate PUSCH transmission timing for the sub-serving cell, and each of subframes 4, 5, 6, 7, 8 and 9 of the main serving cell may instruct maximum 1 PUSCH transmission timing for the sub-serving cell.

Particularly, the G/H(4) of subframe 0 in the main serving cell represents the PUSCH transmission timing to which subframe 0+4 of the sub-serving cell is corresponding, and the P(6) of subframe 4 in the sub-serving cell represents the PHICH reception timing to which subframe 4+6 of the main serving cell is corresponding. The G/H(5) of subframe 0 in the main serving cell represents the PUSCH transmission timing to which subframe 0+5 of the sub-serving cell is corresponding, and the P(5) of subframe 5 in the sub-serving cell represents the PHICH reception timing to which subframe 5+5 of the main serving cell is corresponding.

The G/H(5) of subframe 1 in the main serving cell represents the PUSCH transmission timing to which subframe 1+5 of the sub-serving cell is corresponding, and the P(5) of subframe 6 in the sub-serving cell represents the PHICH reception timing to which subframe 6+5 of the main serving cell is corresponding. The G/H(6) of subframe 1 in the main serving cell represents the PUSCH transmission timing to which subframe 1+6 of the sub-serving cell is corresponding, and the P(4) of subframe 7 in the sub-serving cell represents the PHICH reception timing to which subframe 7+4 of the main serving cell is corresponding.

The G/H(4) of subframe 4 in the main serving cell represents the PUSCH transmission timing to which subframe 4+4 of the sub-serving cell is corresponding, and the P(6) of subframe 8 in the sub-serving cell represents the PHICH reception timing to which subframe 8+6 of the main serving cell is corresponding.

The G/H(4) of subframe 6 in the main serving cell represents the PUSCH transmission timing to which subframe 5+4 of the sub-serving cell is corresponding, and the P(6) of subframe 9 of the next radio frame in the sub-serving cell represents the PHICH reception timing to which subframe 9+6 of the next radio frame of the main serving cell is corresponding.

The G/H(4) of subframe 6 in the main serving cell represents the PUSCH transmission timing to which subframe 6+4 of the sub-serving cell is corresponding, and the P(6) of subframe 0 of the next radio frame in the sub-serving cell represents the PHICH reception timing to which subframe 0+6 of the next radio frame of the main serving cell is corresponding.

The G/H(4) of subframe 7 in the main serving cell represents the PUSCH transmission timing to which subframe 7+4 of the sub-serving cell is corresponding, and the P(6) of subframe 1 of the next radio frame in the sub-serving cell represents the PHICH reception timing to which subframe 1+6 of the next radio frame of the main serving cell is corresponding.

The G/H(4) of subframe 8 in the main serving cell represents the PUSCH transmission timing to which subframe 8+4 of the sub-serving cell is corresponding, and the P(6) of subframe 2 of the next radio frame in the sub-serving cell represents the PHICH reception timing to which subframe 2+6 of the next radio frame of the main serving cell is corresponding.

The G/H(4) of subframe 9 in the main serving cell represents the PUSCH transmission timing to which subframe 9+4 of the sub-serving cell is corresponding, and the P(6) of subframe 3 of the next radio frame in the sub-serving cell represents the PHICH reception timing to which subframe 3+6 of the next radio frame of the main serving cell is corresponding.

According to the above embodiment, for example, the followings (1) the PUSCH transmission timing for PHICH, (2) the PHICH transmission timing for the PUSCH transmission, (3) the PUSCH transmission timing for the UL grant and/or PHICH reception, are represented as below.

(1) The PUSCH Transmission Timing for PHICH

In case that the TDD UL/DL configuration is 4, and the PHICH is received from the resource which is corresponding to $I_{PHICH}=0$ in subframe i, associated PUSCH transmission is made from subframe i−k. Herein, the value k is as shown in Table 23 below.

TABLE 23

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 4 | 6 | 5 | | | 6 | 6 | 6 | 6 | 6 | 6 |

Else, in case that the PHICH is received from the source which is corresponding to $I_{PHICH}=1$ in subframe i=0, associated PUSCH transmission is made from subframe i−5.

Else, in case that the PHICH is received from the source which is corresponding to $I_{PHICH}=1$ in subframe i=1, associated PUSCH transmission is made from subframe i−6.

(2) The PHICH Transmission Timing for the PUSCH Transmission

The PHICH transmission timing which is corresponding to the PUSCH transmission in subframe n is $n+k_{PHICH}$. Herein, the value $k_{PHICH}$ is as shown in Table 24 below.

TABLE 24

| TDD UL/DL | subframe index n | | | | | | | | | |
|---|---|---|---|---|---|---|---|---|---|---|
| Configuration | 0 | 1 | 2 | 3 | 4 | 5 | 6 | 7 | 8 | 9 |
| 4 | 6 | 6 | 6 | 6 | 6 | 5 | 5 | 4 | 6 | 6 |

(3) The PUSCH Transmission Timing for the UL Grant and/or PHICH Reception

When the TDD UL/DL configuration of scheduling cell is 4 and operated in normal HARQ, in case that the PDCCH/EPDCCH and/or PHICH transmission having the UL grant (uplink DCI format) for the corresponding UE is detected in subframe n, 1) if the MSB of UL index (2 bits) included in the PDCCH/EPDCCH having the UL grant is set to 1, or the PHICH is received from the resource that corresponds to $I_{PHICH}=0$ in subframes 0, 1, 4, 5, 6, 7, 8 or 9, the UE adjusts the corresponding PUSCH transmission to subframe n+k. In this case, the value k may follow Table 25 below.

TABLE 25

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 4 | 4 | 5 | | | 4 | 4 | 4 | 4 | 4 | 4 |

2) If the LSB of UL index included in the PDCCH/EPDCCH having the UL grant is set to 1 and received in subframe 0, or the PHICH is received from the resource that corresponds to $I_{PHICH}=1$ in subframe 0, the UE adjusts the corresponding PUSCH transmission to subframe n+5. 3) If the LSB of UL index included in the PDCCH/EPDCCH having the UL grant is set to 1 and received in subframe 1, or the PHICH is received from the resource that corresponds to $I_{PHICH}=1$ in subframe 1, the UE adjusts the corresponding PUSCH transmission to subframe n+6. 4) If the both of MSB and LSB of UL index included in the PDCCH/EPDCCH having the UL grant is set to 1 in subframe n, the corresponding PUSCH transmission is adjusted to be made one out of subframes n+k (here, referring to Table 25 for k), n+5 and n+6. In this case, when adjusting the corresponding PUSCH transmission to be made from one of subframes n+k, n+5 and n+6, the UE may perform it based on the above-described UL grant/PHICH receiving subframe number and the transmission timing of the PUSCH based on the UL index value.

Meanwhile, in this case, the value $I_{PHICH}$, for another example, may be determined according to the following standards.

If the PUSCH is transmitted from subframe 5 or 7, the corresponding PHICH has $I_{PHICH}=1$.

Else, the corresponding PHICH has $I_{PHICH}=0$.

6. TDD UL/DL configuration 5 (scheduling cell)–FDD (scheduled cell) CA

The scheduling cell of the TDD UL/DL configuration 5 may perform downlink transmission from subframes 0, 1, 3, 4, 5, 6, 7, 8 and 9. According to an embodiment of the present invention, for the scheduled cell, from at least 1 subframe (for example, subframe 1) of the scheduling cell, maximum 2 PUSCH transmission timings may be instructed. An embodiment of the present invention is the case of maintaining 10 ms synchronous HARQ cycle. That is, in the aspect of each HARQ process, the UL HARQ is operated based on 10 ms cycle.

FIG. 13 illustrates an example of the UL scheduling/HARQ timing according to the embodiment of the present invention for the case that the TDD UL/DL configuration of the scheduling cell is 5. FIG. 13 shows the case that the main serving cell is the scheduling cell configured with the TDD UL/DL configuration being 5 and the sub-serving cell is the scheduled cell configured with the FDD.

Referring to FIG. 13, subframes 0, 3, 4, 5, 6, 7, 8 and 9 of the main serving cell are set up as DL sub-frames, and subframe 1 is set up as a special subframe. The G/H for the sub-serving cell may be transmitted to the UE from the base station through subframes 0, 1, 3, 4, 5, 6, 7, 8 and 9 of the main serving cell. In this case, subframe 1 of the main serving cell may instruct maximum 2 separate PUSCH transmission timing for the sub-serving cell, and each of subframes 0, 3, 4, 5, 6, 7, 8 and 9 of the main serving cell may instruct maximum 1 PUSCH transmission timing for the sub-serving cell.

Particularly, the G/H(4) of subframe 0 in the main serving cell represents the PUSCH transmission timing to which subframe 0+4 of the sub-serving cell is corresponding, and the P(6) of subframe 4 in the sub-serving cell represents the PHICH reception timing to which subframe 4+6 of the main serving cell is corresponding.

The G/H(4) of subframe 1 in the main serving cell represents the PUSCH transmission timing to which subframe 1+4 of the sub-serving cell is corresponding, and the P(6) of subframe 5 in the sub-serving cell represents the PHICH reception timing to which subframe 5+6 of the main serving cell is corresponding. The G/H(5) of subframe 1 in the main serving cell represents the PUSCH transmission timing to which subframe 1+5 of the sub-serving cell is corresponding, and the P(5) of subframe 6 in the sub-serving cell represents the PHICH reception timing to which subframe 6+5 of the main serving cell is corresponding.

The G/H(4) of subframe 3 in the main serving cell represents the PUSCH transmission timing to which subframe 3+4 of the sub-serving cell is corresponding, and the P(6) of subframe 7 in the sub-serving cell represents the PHICH reception timing to which subframe 7+6 of the main serving cell is corresponding.

The G/H(4) of subframe 4 in the main serving cell represents the PUSCH transmission timing to which subframe 4+4 of the sub-serving cell is corresponding, and the P(6) of subframe 8 in the sub-serving cell represents the PHICH reception timing to which subframe 8+6 of the main serving cell is corresponding.

The G/H(4) of subframe 5 in the main serving cell represents the PUSCH transmission timing to which subframe 5+4 of the sub-serving cell is corresponding, and the P(6) of subframe 9 in the sub-serving cell represents the PHICH reception timing to which subframe 9+6 of the main serving cell is corresponding.

The G/H(4) of subframe 6 in the main serving cell represents the PUSCH transmission timing to which subframe 6+4 of the sub-serving cell is corresponding, and the P(6) of subframe 0 of the next radio frame in the sub-serving cell represents the PHICH reception timing to which subframe 0+6 of the next radio frame of the main serving cell is corresponding.

The G/H(4) of subframe 7 in the main serving cell represents the PUSCH transmission timing to which subframe 7+4 of the sub-serving cell is corresponding, and the P(6) of subframe 1 of the next radio frame in the sub-serving cell represents the PHICH reception timing to which subframe 1+6 of the next radio frame of the main serving cell is corresponding.

The G/H(4) of subframe 8 in the main serving cell represents the PUSCH transmission timing to which subframe 8+4 of the sub-serving cell is corresponding, and the P(6) of subframe 2 of the next radio frame in the sub-serving cell represents the PHICH reception timing to which subframe 2+6 of the next radio frame of the main serving cell is corresponding.

The G/H(4) of subframe 9 in the main serving cell represents the PUSCH transmission timing to which subframe 9+4 of the sub-serving cell is corresponding, and the P(6) of subframe 3 of the next radio frame in the sub-serving cell represents the PHICH reception timing to which subframe 3+6 of the next radio frame of the main serving cell is corresponding.

According to the above embodiment, for example, the followings (1) the PUSCH transmission timing for PHICH, (2) the PHICH transmission timing for the PUSCH transmission, (3) the PUSCH transmission timing for the UL grant and/or PHICH reception, are represented as below.

(1) The PUSCH Transmission Timing for PHICH

In case that the TDD UL/DL configuration is 5, and the PHICH is received from the resource which is corresponding to $I_{PHICH}=0$ in subframe i, associated PUSCH transmission is made from subframe i−k. Herein, the value k is as shown in Table 26 below.

TABLE 26

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 5 | 6 | 6 | | 6 | 6 | 6 | 6 | 6 | 6 | 6 |

Else, in case that the PHICH is received from the source which is corresponding to $I_{PHICH}=1$ in subframe i=1, associated PUSCH transmission is made from subframe i−5.

(2) The PHICH Transmission Timing for the PUSCH Transmission

The PHICH transmission timing which is corresponding to the PUSCH transmission in subframe n is $n+k_{PHICH}$. Herein, the value $k_{PHICH}$ is as shown in Table 27 below.

TABLE 27

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 5 | 6 | 6 | 6 | 6 | 6 | 6 | 5 | 6 | 6 | 6 |

(3) The PUSCH Transmission Timing for the UL Grant and/or PHICH Reception

When the TDD UL/DL configuration of scheduling cell is 5 and operated in normal HARQ, in case that the PDCCH/EPDCCH and/or PHICH transmission having the UL grant (uplink DCI format) for the corresponding UE is detected in subframe n, 1) if the MSB of UL index (2 bits) included in the PDCCH/EPDCCH having the UL grant is set to 1, or the PHICH is received from the resource that corresponds to $I_{PHICH}=0$ in subframes 0, 1, 3, 4, 5, 6, 7, 8 or 9, the UE adjusts the corresponding PUSCH transmission to subframe n+k. In this case, the value k may follow Table 28 below.

TABLE 28

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 5 | 4 | 4 | | 4 | 4 | 4 | 4 | 4 | 4 | 4 |

2) If the LSB of UL index included in the PDCCH/EPDCCH having the UL grant is set to 1 and received in subframe 1, or the PHICH is received from the resource that corresponds to $I_{PHICH}=1$ in subframe 1, the UE adjusts the corresponding PUSCH transmission to subframe n+5. 3) If the both of MSB and LSB of UL index included in the PDCCH/EPDCCH having the UL grant is set to 1 in subframe n, the corresponding PUSCH transmission is adjusted to be made subframes n+k (here, referring to Table 28 for k), and n+5. In this case, when adjusting the corresponding PUSCH transmission to be made from subframes n+k and n+5, the UE may perform it based on the above-described UL grant/PHICH receiving subframe number and the transmission timing of the PUSCH based on the UL index value.

Meanwhile, in this case, the value $I_{PHICH}$, for another example, may be determined according to the following standards.

If the PUSCH is transmitted from subframe 6, the corresponding PHICH has $I_{PHICH}=1$.

Else, the corresponding PHICH has $I_{PHICH}=0$.

7. TDD UL/DL configuration 6 (scheduling cell)–FDD (scheduled cell) CA

The scheduling cell of the TDD UL/DL configuration 6 may perform downlink transmission from subframes 0, 1, 5, 6, and 9. According to an embodiment of the present invention, for the scheduled cell, from at least 3 subframes (for example, subframes 0, 1, and 5) of the scheduling cell, maximum 2 PUSCH transmission timings may be instructed, from at least 1 subframe (for example, subframe 6) of the scheduling cell, maximum 3 PUSCH transmission timings may be instructed, and from at least 1 subframe (for example, subframe 9) of the scheduling cell, only one PUSCH transmission timing may be instructed. An embodiment of the present invention is the case of maintaining 10 ms synchronous HARQ cycle. In this case, some of HARQ process may be the multiple of 10 ms in the cycle. That is, in the aspect of each HARQ process, the UL HARQ is operated based on 10 ms cycle.

FIG. 14 illustrates an example of the UL scheduling/HARQ timing according to the embodiment of the present invention for the case that the TDD UL/DL configuration of the scheduling cell is 6. FIG. 14 shows the case that the main serving cell is the scheduling cell configured with the TDD UL/DL configuration being 6 and the sub-serving cell is the scheduled cell configured with the FDD.

Referring to FIG. 14, subframes 0, 5, and 9 of the main serving cell are set up as DL sub-frames, and subframes 1 and 6 are set up as special subframes. The G/H for the sub-serving cell may be transmitted to the UE from the base station through subframes 0, 1, 5, 6, and 9 of the main serving cell. In this case, subframes 0, 1, and 5 of the main serving cell may instruct maximum 2 separate PUSCH transmission timing for the sub-serving cell, subframe 6 of the main serving cell may instruct maximum 3 different PUSCH transmission timings for the sub-serving cell, and subframe 9 of the main serving cell may instruct maximum 1 PUSCH transmission timing for the sub-serving cell.

Particularly, the G/H(5) of subframe 0 in the main serving cell represents the PUSCH transmission timing to which subframe 0+5 of the sub-serving cell is corresponding, and the P(5) of subframe 5 in the sub-serving cell represents the PHICH reception timing to which subframe 5+5 of the main serving cell is corresponding. The G/H(7) of subframe 0 in the main serving cell represents the PUSCH transmission timing to which subframe 0+7 of the sub-serving cell is corresponding, and the P(13) of subframe 7 in the sub-serving cell represents the PHICH reception timing to which subframe 7+13 of the main serving cell is corresponding.

The G/H(5) of subframe 1 in the main serving cell represents the PUSCH transmission timing to which subframe 1+5 of the sub-serving cell is corresponding, and the P(5) of subframe 6 in the sub-serving cell represents the PHICH reception timing to which subframe 6+5 of the main serving cell is corresponding. The G/H(7) of subframe 1 in the main serving cell represents the PUSCH transmission timing to which subframe 1+7 of the sub-serving cell is corresponding, and the P(13) of subframe 8 in the sub-serving cell represents the PHICH reception timing to which subframe 8+13 of the main serving cell is corresponding.

The G/H(4) of subframe 5 in the main serving cell represents the PUSCH transmission timing to which subframe 5+4 of the sub-serving cell is corresponding, and the P(6) of subframe 9 in the sub-serving cell represents the PHICH reception timing to which subframe 9+6 of the main serving cell is corresponding. The G/H(7) of subframe 5 in the main serving cell represents the PUSCH transmission timing to which subframe 5+7 of the sub-serving cell is corresponding, and the P(13) of subframe 2 of the next radio frame in the sub-serving cell represents the PHICH reception timing to which subframe 2+13 of the next radio frame of the main serving cell is corresponding.

The G/H(4) of subframe 6 in the main serving cell represents the PUSCH transmission timing to which subframe 6+4 of the sub-serving cell is corresponding, and the P(6) of subframe 0 of the next radio frame in the sub-serving cell represents the PHICH reception timing to which subframe 0+6 of the next radio frame of the main serving cell is corresponding. The G/H(5) of subframe 6 in the main serving cell represents the PUSCH transmission timing to which subframe 6+5 of the sub-serving cell is corresponding, and the P(5) of subframe 1 of the next radio frame in the sub-serving cell represents the PHICH reception timing to which subframe 1+5 of the next radio frame of the main serving cell is corresponding. The G/H(7) of subframe 6 in the main serving cell represents the PUSCH transmission timing to which subframe 6+7 of the sub-serving cell is corresponding, and the P(13) of subframe 3 of the next radio frame in the sub-serving cell represents the PHICH reception timing to which subframe 3+13 of the next radio frame of the main serving cell is corresponding.

The G/H(5) of subframe 9 in the main serving cell represents the PUSCH transmission timing to which subframe 9+5 of the sub-serving cell is corresponding, and the P(5) of subframe 4 of the next radio frame in the sub-serving cell represents the PHICH reception timing to which subframe 4+5 of the next radio frame of the main serving cell is corresponding.

According to the above embodiment, for example, the followings (1) the PUSCH transmission timing for PHICH, (2) the PHICH transmission timing for the PUSCH transmission, (3) the PUSCH transmission timing for the UL grant and/or PHICH reception, are represented as below.

(1) The PUSCH Transmission Timing for PHICH

In case that the TDD UL/DL configuration is 6, and the PHICH is received from the resource which is corresponding to $I_{PHICH}=0$ in subframe i, associated PUSCH transmission is made from subframe i–k. Herein, the value k is as shown in Table 29 below.

TABLE 29

| TDD UL/DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 6 | 5 | 5 | | | | 6 | 6 | | | 5 |

Else, in case that the PHICH is received from the source which is corresponding to $I_{PHICH}=1$ in subframe i=0, associated PUSCH transmission is made from subframe i–13.

Else, in case that the PHICH is received from the source which is corresponding to $I_{PHICH}=1$ in subframe i=1, associated PUSCH transmission is made from subframe i–13.

Else, in case that the PHICH is received from the source which is corresponding to $I_{PHICH}=1$ in subframe i=5, associated PUSCH transmission is made from subframe i–13.

Else, in case that the PHICH is received from the source which is corresponding to $I_{PHICH}=1$ in subframe i=6, associated PUSCH transmission is made from subframe i–5.

Else, in case that the PHICH is received from the source which is corresponding to $I_{PHICH}=2$ in subframe i=6, associated PUSCH transmission is made from subframe i–13.

(2) The PHICH Transmission Timing for the PUSCH Transmission

The PHICH transmission timing which is corresponding to the PUSCH transmission in subframe n is $n+k_{PHICH}$. Herein, the value $k_{PHICH}$ is as shown in Table 30 below.

TABLE 30

| TDD UL/DL | subframe index n | | | | | | | | | |
|---|---|---|---|---|---|---|---|---|---|---|
| Configuration | 0 | 1 | 2 | 3 | 4 | 5 | 6 | 7 | 8 | 9 |
| 6 | 6 | 5 | 13 | 13 | 5 | 5 | 5 | 13 | 13 | 6 |

(3) The PUSCH Transmission Timing for the UL Grant and/or PHICH Reception

When the TDD UL/DL configuration of scheduling cell is 6 and operated in normal HARQ, in case that the PDCCH/EPDCCH and/or PHICH transmission having the UL grant (uplink DCI format) for the corresponding UE is detected in subframe n, 1) if the MSB of UL index (3 bits) included in the PDCCH/EPDCCH having the UL grant is set to 1, or the PHICH is received from the resource that corresponds to $I_{PHICH}=0$ in subframes 0, 1, 5, 6 or 9, the UE adjusts the corresponding PUSCH transmission to subframe n+k. In this case, the value k may follow Table 31 below.

TABLE 31

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 6 | 5 | 5 | | | | 4 | 4 | | | 5 |

2) If the LSB of UL index included in the PDCCH/EPDCCH having the UL grant is set to 1 and received in subframe 0, or the PHICH is received from the resource that corresponds to $I_{PHICH}=1$ in subframe 0, the UE adjusts the corresponding PUSCH transmission to subframe n+7. 3) If the LSB of UL index included in the PDCCH/EPDCCH having the UL grant is set to 1 and received in subframe 1, or the PHICH is received from the resource that corresponds to $I_{PHICH}=1$ in subframe 1, the UE adjusts the corresponding PUSCH transmission to subframe n+7. 4) If the LSB of UL index included in the PDCCH/EPDCCH having the UL grant is set to 1 and received in subframe 5, or the PHICH is received from the resource that corresponds to $I_{PHICH}=1$ in subframe 5, the UE adjusts the corresponding PUSCH transmission to subframe n+7. 5) If the LSB of UL index included in the PDCCH/EPDCCH having the UL grant is set to 1 and received in subframe 6, or the PHICH is received from the resource that corresponds to $I_{PHICH}=1$ in subframe 6, the UE adjusts the corresponding PUSCH transmission to subframe n+5. 6) If the rest bits except for the MSB and LSB of UL index included in the PDCCH/EPDCCH having the UL grant is set to 1 and received in subframe 6, or the PHICH is received from the resource that corresponds to $I_{PHICH}=2$ in subframe 6, the UE adjusts the corresponding PUSCH transmission to subframe n+7. 7) If the multiple bits of UL index (3 bits) included in the PDCCH/EPDCCH having the UL grant is set to 1 in subframe n at the same time, the corresponding PUSCH transmission is adjusted to be made one out of subframes n+k (here, referring to Table 31 for k), n+5, and n+7. In this case, when adjusting the corresponding PUSCH transmission to one of subframes n+k, n+5, and n+7, the UE may perform it based on the above-described UL grant/PHICH receiving subframe number and the transmission timing of the PUSCH based on the UL index value.

Meanwhile, in this case, the value $I_{PHICH}$ for another example, may be determined according to the following standards.

If the PUSCH is transmitted from subframes 2, 7, or 8, the corresponding PHICH has $I_{PHICH}=1$.

If the PUSCH is transmitted from subframe 3, the corresponding PHICH has IPHICH=2.

Else, the corresponding PHICH has $I_{PHICH}=0$.

Meanwhile, the UL index relevant to the aforesaid HARQ timing or the value $I_{PHICH}$ is an example, particularly, in case that a plurality of PUSCH or PHICH transmission timings are instructed through a DL subframe, the relations of the UL index or the value $I_{PHICH}$ and each of suggested timing values may be differently matched. That is, in each of the aforesaid methods, within the three timings handled in common (1) the PUSCH transmission timing for PHICH, (2) the PHICH transmission timing for the PUSCH transmission, (3) the PUSCH transmission timing for the UL grant and/or PHICH reception, in case of multiple transmission timing related to a subframe, the relations of the corresponding timings and the UL index or the value $I_{PHICH}$ may be differently matched.

Additionally, respective UL scheduling and HARQ related timing are suggested according to the TDD UL/DL configuration of TDD cell above, in order to simplify the implementation and to minimize the impact for the standard, the timing suggested for a TDD UL/DL configuration may be applied to the case of different TDD UL/DL configuration in the same basis. For example, the timing plan that is suggested for the FDD scheduled cell in case that the TDD UL/DL configuration of scheduling cell is 0 may be applied to the FDD scheduled cell even in the case that the TDD UL/DL configuration of scheduling cell is 1 to 6 within the range in which the same basis is applied.

Figure 15:
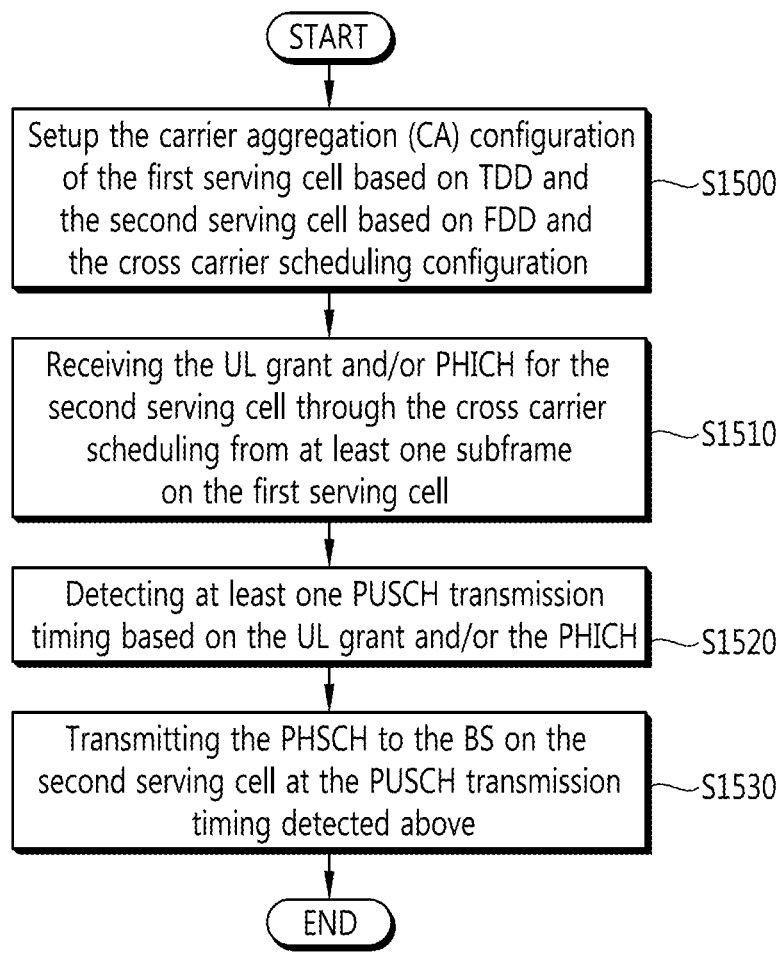
FIG. 15 is a flowchart illustrating an example of UL HARQ supporting method performed by a UE in case that a carrier aggregation of TDD cell and FDD cell is setup to the UE, and the TDD cell is scheduled by cross carrier to the UE as a scheduling cell.

FIG. 15 is a flowchart illustrating an example of UL HARQ supporting method performed by a UE in case that a carrier aggregation of TDD cell and FDD cell is setup to the UE, and the TDD cell is scheduled by cross carrier to the UE as a scheduling cell. In FIG. 15, the case that the carrier aggregation (CA) of the serving cell based on TDD and the serving cell based on FDD are setup to a UE is described, as described above, the present invention can be applied to the case of double connection is setup to a UE as well as the case of CA.

Referring to FIG. 15, the UE performs the carrier aggregation (CA) configuring of the first serving cell based on TDD and the second serving cell based on FDD, and the cross carrier scheduling configuring in which the first serving cell is configured as the scheduling cell and the second serving cell is configured as the scheduled cell (S1500). In order to perform the CA configuration of the first serving cell based on TDD and the second serving cell based on FDD, the UE may receive the carrier aggregation configuration information (TDD-FDD CA) and the cross carrier configuration information through the RRC signaling from the base station. In this case, for example, the first serving cell may be a main serving cell and the second cell may be a sub-serving cell.

The UE receives the UL grant and/or PHICH for the second serving cell through the cross carrier scheduling from at least one subframe on the first serving cell (S1510). In this case, the reception of the UL grant and/or the PHICH may be performed on the basis of the PHICH timing for the PUSCH transmission described by the embodiments of the present invention for the TDD UL/DL configuration 0 to 6 of the TDD cell (scheduling cell).

The UL grant may include the UL index having the size of 3 bits or more. If 3 bits of the UL index are set to 1, the UL grant may instruct three different PUSCH transmission timings. If 2 bits of the UL index are set to 1, the UL grant may instruct two different PUSCH transmission timings.

Otherwise, the UL grant may include the UL index of 2 bits size. In this case, if all of 2 bits of the UL index are set to 1, the UL grant may instruct two different PUSCH transmission timings.

The UE, based on the UL grant and/or the PHICH, detects at least one PUSCH transmission timing (S1520). In this case, the detection of the PUSCH transmission timing may be performed on the basis of the PUSCH transmission timing for the UL grant and/or PHICH reception described by the embodiments of the present invention for the TDD UL/DL configuration 0 to 6 of the TDD cell (scheduling cell). In this case, in a radio frame, the maximum number of the PUSCH transmission timing for the second serving cell which is detected through the first serving cell may be 10 or more.

The UE transmits the PHSCH to the BS on the second serving cell at the PUSCH transmission timing detected above (S1530). Later, the UE may detect the reception timing of the PHICH and/or UL grant corresponding to the PUSCH transmitted above. In this case, the detection of the reception timing of the PHICH and/or UL grant corresponding to the transmitted PUSCH may be performed on the basis of the PHICH timing for the PUSCH transmission described by the embodiments of the present invention for the TDD UL/DL configuration 0 to 6 of the TDD cell (scheduling cell).

The UE may receive the corresponding PHICH and/or the UL grant on the first serving cell on the detected reception timing, and also retransmit the PUSCH on the PUSCH transmission timing indicated by the corresponding PHICH and/or the UL grant.

According to the present invention, the UL HARQ process for the second serving cell may have synchronized HARQ cycle of 10 ms.

Figure 16:
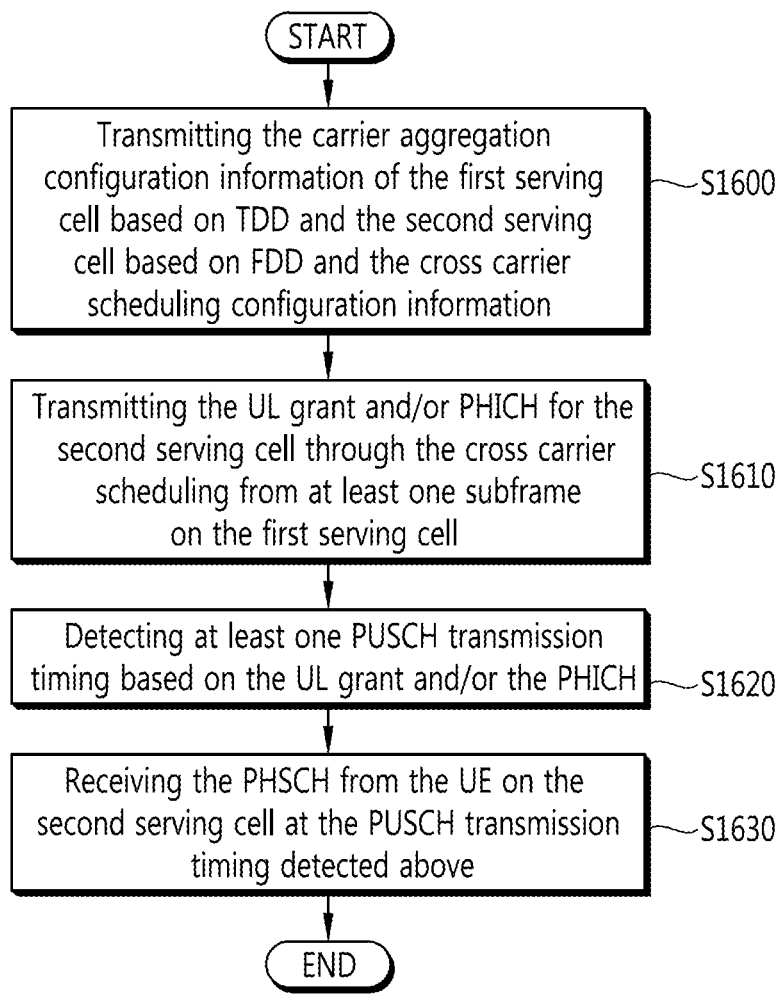
FIG. 16 is a flowchart illustrating an example of UL HARQ supporting method performed by a BS in case that a carrier aggregation of TDD cell and FDD cell is setup to the UE, and the TDD cell is scheduled by cross carrier to the UE as a scheduling cell.

FIG. 16 is a flowchart illustrating an example of UL HARQ supporting method performed by a BS in case that a carrier aggregation of TDD cell and FDD cell is setup to the UE, and the TDD cell is scheduled by cross carrier to the UE as a scheduling cell. In FIG. 16, the case that the carrier aggregation (CA) of the serving cell based on TDD and the serving cell based on FDD are setup to a UE is described, as described above, the present invention can be applied to the case of double connection is setup to a UE as well as the case of CA.

Referring to FIG. 16, the BS generates the carrier aggregation configuration information that configures the carrier aggregation (CA) of the first serving cell based on TDD and the second serving cell based on FDD, and the cross carrier scheduling information that configures the first serving cell as the scheduling cell and the second serving cell as the scheduled cell and transmits them to the UE (S1600). In order to perform CA configuration of the first serving cell based on TDD and the second serving cell based on FDD, the BS may transmit the carrier aggregation configuration information and the cross carrier configuration information to the UE through the RRC signaling. In this case, for example, the first serving cell may be a main serving cell and the second cell may be a sub-serving cell.

The BS transmits the UL grant and/or PHICH for the second serving cell to the UE through the cross carrier scheduling from at least one subframe on the first serving cell (S1610). In this case, the transmission of the UL grant and/or the PHICH may be performed on the basis of the PHICH timing for the PUSCH transmission described by the embodiments of the present invention for the TDD UL/DL configuration 0 to 6 of the TDD cell (scheduling cell).

The BS, based on the UL grant and/or the PHICH, detects at least one PUSCH reception timing (S1620). In this case, the detection of the PUSCH reception timing may be performed on the basis of the PUSCH transmission timing for the UL grant and/or PHICH reception described by the embodiments of the present invention for the TDD UL/DL configuration 0 to 6 of the TDD cell (scheduling cell). In this case, in a radio frame, the maximum number of the PUSCH reception timing for the second serving cell which is detected through the first serving cell may be 10 or more.

The BS receives the PHSCH from the UE on the second serving cell at the PUSCH reception timing detected above (S1630). Later, the BS may detect the transmission timing of the PHICH and/or UL grant corresponding to the PUSCH transmitted above on the basis of the PHICH timing for the PUSCH transmission described by the embodiments of the present invention for the TDD UL/DL configuration 0 to 6 of the TDD cell (scheduling cell). The BS may transmit the corresponding PHICH and/or the UL grant on the first serving cell on the detected reception timing, and also receive the PUSCH again on the PUSCH reception timing indicated by the corresponding PHICH and/or the UL grant and perform the HARQ operation.

According to the present invention described above, in case that the TDD-FDD carrier aggregation (or double connection) is configured and the cross carrier scheduling is configured to the UE, the UL scheduling/HARQ timing can be effectively controlled, and by increasing the usability of multiple UL resources of the scheduled cell, the data transmission efficiency can be improved to fit the purpose of performing the carrier aggregation (or double connection) in order to fulfill the high data transmission rate to the UE.

Case 2. In case of FDD (main serving cell=scheduling cell)–TDD (sub-serving cell=scheduled cell) CA If the FDD cell is the scheduling cell, the DL subframe exists in all subframe of the FDD cell even in case that the cross carrier scheduling is configured, therefore there is no limit on the UL grant/PHICH transmission. However, in the conventional method, the HARQ timing for the TDD-FDD CA is not described, and in case of performing the HARQ operation based on the HARQ timing of the FDD cell which is the scheduling cell, it has the HARQ cycle of 8 ms, consequently, the problem may occur that the UL subframe of the TDD cell, which is the scheduled cell, and the PUSCH transmission timing is not matched. For example, in case of transmitting the PUSCH from subframe 2 of the TDD cell, which is the scheduled cell of the TDD UL/DL configuration 1, the corresponding PHICH may be received in subframe 6 of the FDD cell, which is the scheduling cell, and in case that the PHICH represents NACK, according to the conventional method, although subframe 0 of the next radio frame of the TDD cell is corresponding to the PUSCH transmission timing, the PUSCH may not be transmitted from subframe 0 of the TDD cell since it is the DL subframe. (In addition, there is a problem that a load is biased in the following reasons. First, in case of the HARQ timing for CA among TDD cells being applied supposing that the TDD UL/DL configuration of the TDD cell which is the scheduled cell is the UL reference UL/DL configuration, features of the FDD cell which is the scheduling cell are not reflected. Second, the reception of UL grant/PHICH for scheduled cell is performed by a few specific number of subframe although the DL subframe exists in all subframes of the FDD cell. Accordingly, the optimized HARQ timing (and the UL scheduling timing) is required for the UE in which the FDD is setup by the cross carrier scheduling as the scheduling cell.

In an embodiment of the present invention, in case that the TDD-FDD CA and the cross carrier scheduling are configured at a UE, and the FDD cell is the scheduling cell and the TDD cell is the scheduled cell, the UL scheduling/HARQ timing having the HARQ cycle of 10 ms is provided. An embodiment of the present invention has the following characteristics.

After the UL grant is received, and 4 ms later, the PUSCH transmission is performed.

After transmitting the PUSCH, and 6 ms later, the UL grant and/or the PHICH are received.

After receiving the PHICH, and 4 ms later, the PUSCH transmission is performed.

FIG. 17 illustrates an example of the UL scheduling/HARQ timing according to an embodiment of the present invention for the case that the scheduling cell is the FDD cell and the scheduled cell is the TDD cell. FIG. 17 is the case, for example, that the main serving cell is the scheduling cell which is configured as the FDD and the sub serving cell is the scheduled cell which is configured as the TDD UL/DL configuration zero. However, the present embodiment is not limited to the case that the TDD UL/DL configuration of the sub serving cell is zero.

Referring to FIG. 17, subframes 2, 3, 4, 7, 8 and 9 of the sub serving cell are set up as UL sub-frames. The G/H for the sub-serving cell may be transmitted to the UE from the base station through subframes 0, 3, 4, 5, 8 and 9 of the main serving cell. The G/H(4) received from subframe m in the main serving cell represents the PUSCH transmission timing to which subframe m+4 of the sub-serving cell is corresponding, and the P(6) received from subframe m in the sub-serving cell represents the PHICH reception timing to which subframe m+6 of the main serving cell is corresponding.

According to the above embodiment, for example, the followings (1) the PUSCH transmission timing for PHICH, (2) the PHICH transmission timing for the PUSCH transmission, (3) the PUSCH transmission timing for the UL grant and/or PHICH reception, are represented as below.

(1) The PUSCH Transmission Timing for PHICH

In case that the TDD UL/DL configuration of the TDD cell (or the UL reference UL/DL configuration in case that the TDD UL/DL configuration of the TDD cell of the case of TDD-FDD CA is the UL reference UL/DL configuration) is 0 to 6, and the PHICH is received from the resource which is corresponding to $I_{PHICH}=0$ in subframe i, associated PUSCH transmission is made from subframe i−k. Herein, the value k is as shown in Table 32 below.

TABLE 32

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 6 | | | 6 | 6 | 6 | | | 6 | 6 |
| 1 | | | | 6 | 6 | | | | 6 | 6 |
| 2 | | | | | 6 | | | | 6 | |
| 3 | 6 | | | | | | | | 6 | 6 |
| 4 | | | | | | | | | 6 | 6 |
| 5 | | | | | | | | | 6 | |
| 6 | 6 | | | 6 | 6 | | | | 6 | 6 |

(2) The PHICH Transmission Timing for the PUSCH Transmission

The PHICH transmission timing which is corresponding to the PUSCH transmission in subframe n is $n+k_{PHICH}$. Herein, the value $k_{PHICH}$ is as shown in Table 33 below.

TABLE 33

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | 6 | 6 | | | 6 | 6 | 6 |
| 1 | | | 6 | 6 | | | | 6 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 6 | 6 | 6 | | | 6 | 6 | |

(3) The PUSCH Transmission Timing for the UL Grant and/or PHICH Reception

When the TDD UL/DL configuration of the TDD cell (scheduled cell) is 0 to 6 and operated in normal HARQ, in case that the PDCCH/EPDCCH and/or PHICH transmission having the UL grant (uplink DCI format) for the corresponding UE is detected in subframe n, the UE adjusts the corresponding PUSCH transmission to subframe n+k. In this case, the value k may follow Table 34 below.

TABLE 34

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | | | 4 | 4 | 4 | | | 4 | 4 |
| 1 | | | | 4 | 4 | | | | 4 | 4 |
| 2 | | | | | 4 | | | | 4 | |

TABLE 34-continued

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 3 | 4 | | | | | | | | 4 | 4 |
| 4 | | | | | | | | | 4 | 4 |
| 5 | | | | | | | | | 4 | |
| 6 | 4 | | | 4 | 4 | | | | 4 | 4 |

Figure 18:
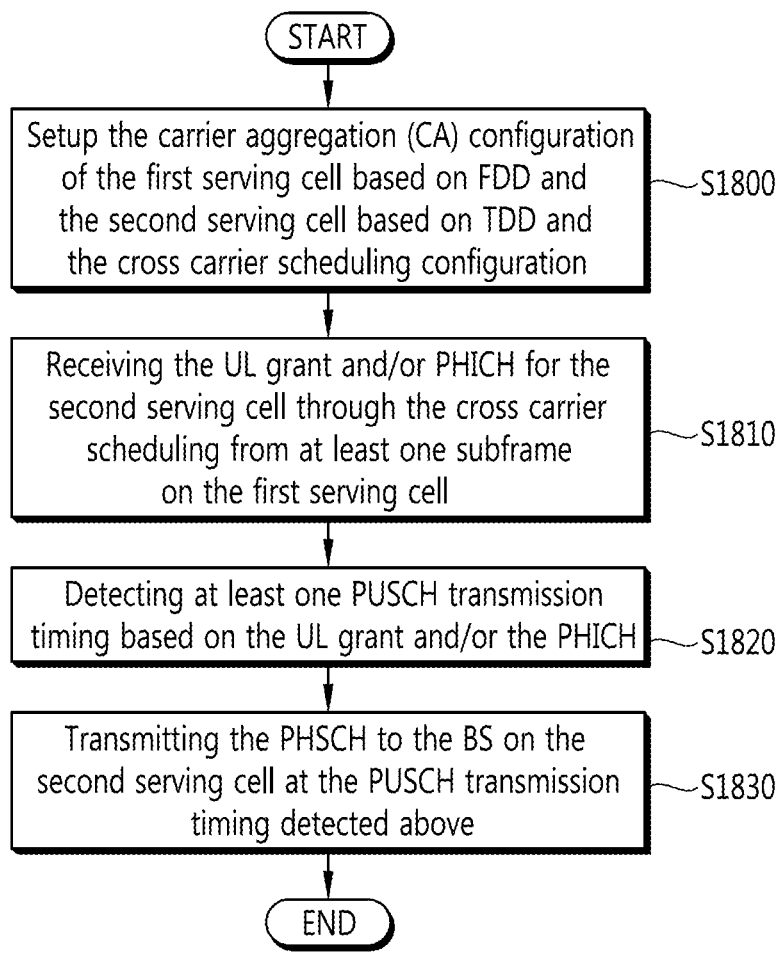
FIG. 18 is a flowchart illustrating an example of HARQ supporting method according to the present invention in case that a carrier aggregation of TDD cell and FDD cell is setup to the UE, and the FDD cell is setup as the scheduling cell.

FIG. 18 is a flowchart illustrating an example of HARQ supporting method according to the present invention in case that a carrier aggregation of TDD cell and FDD cell is setup to the UE, and the FDD cell is setup as the scheduling cell. In FIG. 18, the case that the carrier aggregation (CA) of the serving cell based on TDD and the serving cell based on FDD are setup to a UE is described, as described above, the present invention can be applied to the case of double connection is setup to a UE as well as the case of CA.

Referring to FIG. 18, the UE performs the carrier aggregation (CA) configuring of the first serving cell based on FDD and the second serving cell based on TDD, and the cross carrier scheduling configuring in which the first serving cell is configured as the scheduling cell and the second serving cell is configured as the scheduled cell (S1800). In order to perform the CA configuration of the first serving cell based on FDD and the second serving cell based on TDD, the UE may receive the carrier aggregation configuration information (TDD-FDD CA) and the cross carrier configuration information through the RRC signaling from the base station. In this case, for example, the first serving cell may be a main serving cell and the second cell may be a sub-serving cell.

The UE receives the UL grant and/or PHICH for the second serving cell through the cross carrier scheduling from at least one subframe on the first serving cell (S1810). In this case, the reception of the UL grant and/or the PHICH may be performed on the basis of the PHICH timing for the PUSCH transmission described by the embodiments of the present invention for the case that the FDD cell is the scheduling cell and the TDD cell is the scheduled cell.

As an example, after transmitting the PUSCH, and 6 ms later (or next 6th subframe), the UL grant and/or the PHICH may be received.

The UE, based on the UL grant and/or the PHICH, detects at least one PUSCH transmission timing (S1820). In this case, the detection of the PUSCH transmission timing may be performed on the basis of the PUSCH transmission timing for the UL grant and/or PHICH reception described by the embodiments of the present invention for the case that the FDD cell is the scheduling cell and the TDD cell is the scheduled cell.

As an example, after receiving the UL grant and/or the PHICH, and 4 ms later (or next 4th subframe), the PUSCH transmission may be performed.

The UE transmits the PHSCH to the BS on the second serving cell at the PUSCH transmission timing detected above (S1830). Later, the UE may detect the reception timing of the PHICH and/or UL grant corresponding to the PUSCH transmitted above. In this case, the detection of the reception timing of the PHICH and/or UL grant corresponding to the transmitted PUSCH may be performed on the basis of the PHICH timing for the PUSCH transmission described by the embodiments of the present invention for the case that the FDD cell is the scheduling cell and the TDD cell is the scheduled cell.

The UE may receive the corresponding PHICH and/or the UL grant on the first serving cell on the detected reception timing, and also retransmit the PUSCH on the PUSCH transmission timing indicated by the corresponding PHICH and/or the UL grant.

Figure 19:
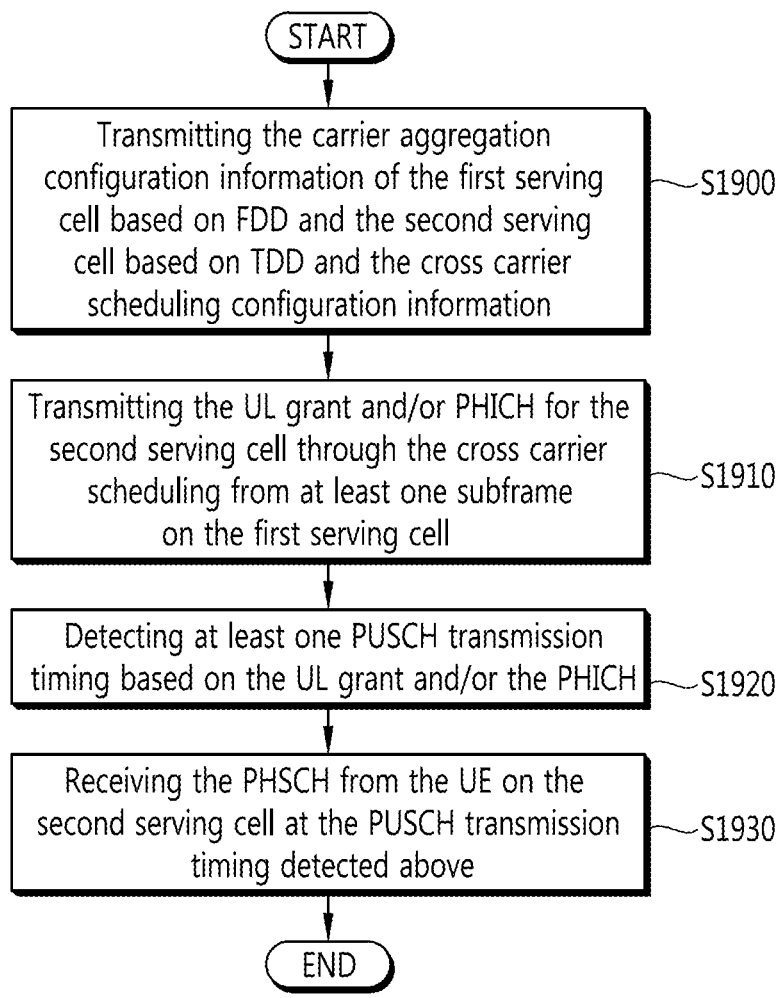
FIG. 19 is a flowchart illustrating an example of HARQ supporting method performed by a UE in case that a carrier aggregation of TDD cell and FDD cell is setup to the UE, and the FDD cell is setup as the scheduling cell.

FIG. 19 is a flowchart illustrating an example of HARQ supporting method performed by a UE in case that a carrier aggregation of TDD cell and FDD cell is setup to the UE, and the FDD cell is setup as the scheduling cell. In FIG. 19, the case that the carrier aggregation (CA) of the serving cell based on TDD and the serving cell based on FDD are setup to a UE is described, as described above, the present invention can be applied to the case of double connection is setup to a UE as well as the case of CA.

Referring to FIG. 19, the BS generates the carrier aggregation configuration information that configures the carrier aggregation (CA) of the first serving cell based on FDD and the second serving cell based on TDD, and the cross carrier scheduling information that configures the first serving cell as the scheduling cell and the second serving cell as the scheduled cell and transmits them to the UE (S1900). In order to perform CA configuration of the first serving cell based on FDD and the second serving cell based on TDD, the BS may transmit the carrier aggregation configuration information and the cross carrier configuration information to the UE through the RRC signaling. In this case, for example, the first serving cell may be a main serving cell and the second cell may be a sub-serving cell.

The BS transmits the UL grant and/or PHICH for the second serving cell to the UE through the cross carrier scheduling from at least one subframe on the first serving cell (S1910). In this case, the transmission of the UL grant and/or the PHICH may be performed on the basis of the PHICH timing for the PUSCH transmission described by the embodiments of the present invention for the case that the FDD cell is the scheduling cell and the TDD cell is the scheduled cell.

As an example, after receiving the PUSCH, and 6 ms later (or next 6th subframe), the UL grant and/or the PHICH may be transmitted.

The BS, based on the UL grant and/or the PHICH, detects at least one PUSCH reception timing (S1920). In this case, the detection of the PUSCH reception timing may be performed on the basis of the PUSCH transmission timing for the UL grant and/or PHICH reception described by the embodiments of the present invention for the case that the FDD cell is the scheduling cell and the TDD cell is the scheduled cell.

As an example, after transmitting the UL grant and/or the PHICH, and 4 ms later (or next 4th subframe), the PUSCH reception may be performed.

The BS receives the PHSCH to the BS on the second serving cell from the UE at the PUSCH transmission timing detected above (S1930). Later, the BS may detect the transmission timing of the PHICH and/or UL grant corresponding to the PUSCH received above based on the basis of the PHICH timing for the PUSCH transmission described by the embodiments of the present invention for the case that the FDD cell is the scheduling cell and the TDD cell is the scheduled cell. The BS may transmit the corresponding PHICH and/or the UL grant on the first serving cell on the detected reception timing, and also receive the PUSCH again and perform the HARQ operation on the PUSCH reception timing indicated by the corresponding PHICH and/or the UL grant.

Figure 20:
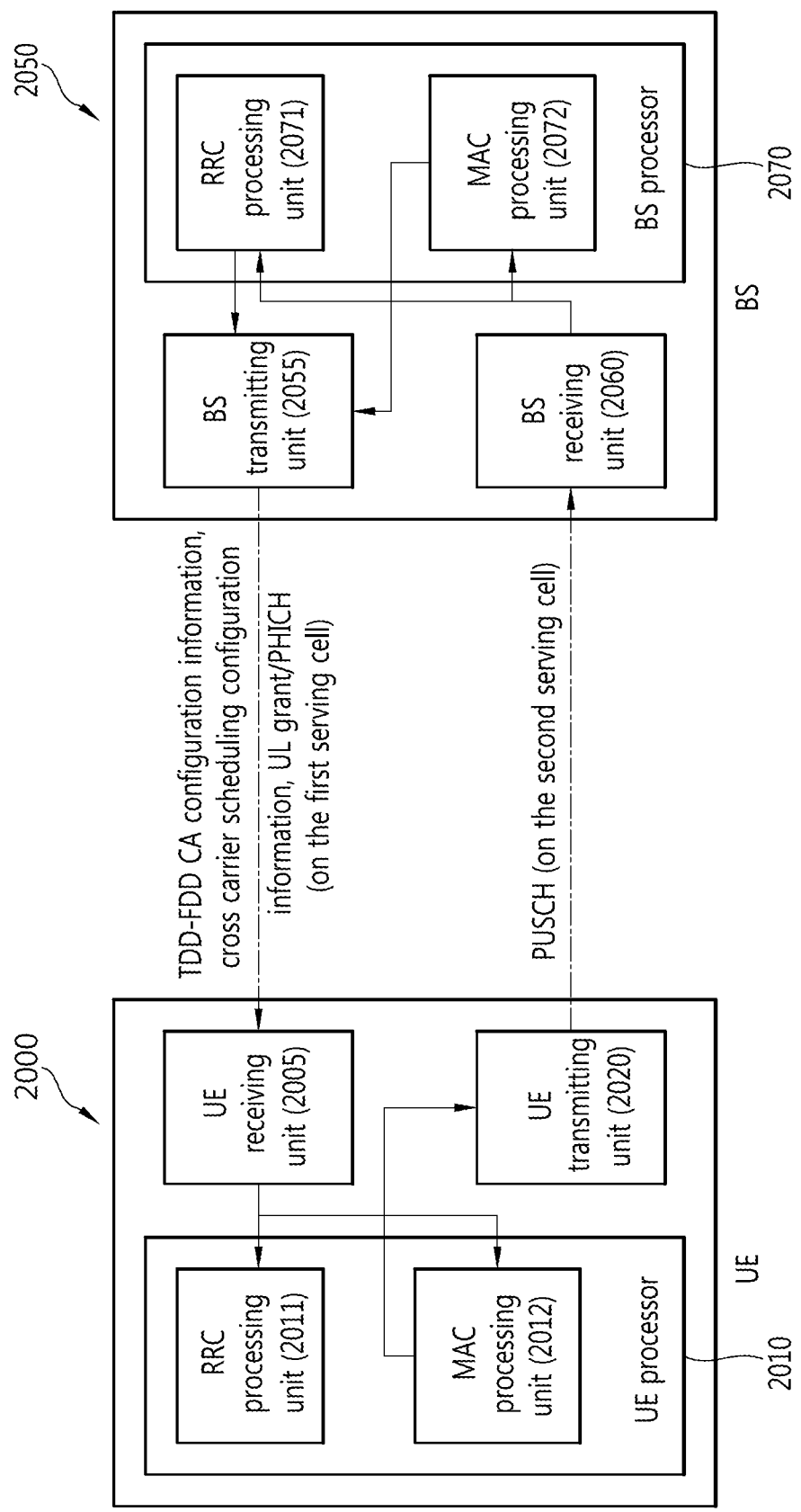
FIG. 20 is a block diagram illustrating the BS and UE performing the UL scheduling/HARQ operations according to the present invention.

FIG. 20 is a block diagram illustrating the BS and UE performing the UL scheduling/HARQ operations according to the present invention.

Referring to FIG. 20, the UE 2000 includes a UE receiving unit 2005, a UE processor 2010 and a UE transmitting unit 2020. The UE processor 2010 also includes a RRC processing unit 2011 and a MAC processing unit 2012.

The UE receiving part 2005 receives the carrier aggregation (CA) configuration information of the first serving cell based on the TDD and the second serving cell based on the FDD and the configuration information (cross carrier configuration information) for the scheduling method that indicates the scheduling of the second serving cell on the first serving cell from the BS 2050 through the RRC signaling.

Otherwise, the UE receiving part 2005 receives the carrier aggregation (CA) configuration information of the first serving cell based on the FDD and the second serving cell based on the TDD and the cross carrier configuration information for the scheduling method that indicates the scheduling of the second serving cell on the first serving cell from the BS 2050 through the RRC signaling.

The RRC processing unit 2011 analyzes/interprets the RRC signaling, and based on the carrier aggregation configuration information of the first serving cell based on the TDD and the second serving cell based on the FDD, setup the carrier aggregation of the first serving cell based on the TDD and the second serving cell based on the FDD and the cross carrier scheduling to the UE.

The UE receiving unit 2005 receives the UL grant and/or the PHICH for the second serving cell through the cross carrier scheduling on the first serving cell.

The MAC processing unit 2012 controls the UL grant and/or the PHICH reception timing, and controls the transmission timing of the corresponding PUSCH. In this case, the reception timing of the UL grant and/or the PHICH and the transmission timing of the corresponding PUSCH may be detected and controlled according to the standards suggested by the embodiments of the present invention described above.

The UE transmitting unit 2020 transmits the PUSCH to the BS 2050 through the second serving cell on the PUSCH transmission timing.

The BS 2050 includes a BS transmitting unit 2055, a BS receiving unit 2060 and a BS processor 2070. The BS processor 2070 also includes a RRC processing unit 2071 and a MAC processing unit 2072.

The RRC processing unit 2071 generates the carrier aggregation configuration information and the cross carrier scheduling configuration information of the first serving cell based on the TDD and the second serving cell based on the FDD. Otherwise, the RRC processing unit 2071 generates the carrier aggregation configuration information of the first serving cell based on the FDD and the second serving cell based on the TDD and the cross carrier scheduling information in which the first serving cell is the scheduling cell. The RRC processing unit 2071 transmits the RRC signaling including the carrier aggregation configuration information to the UE 2000 through the BS transmitting unit 2055. The RRC processing unit 2071 transmits the RRC signaling including the cross carrier scheduling configuration information to the UE 2000 through the BS transmitting unit 2055.

The MAC processing unit 2072 controls the UL grant and/or the PHICH transmission timing, and controls the reception timing of the corresponding PUSCH. In this case, the transmission timing of the UL grant and/or the PHICH and the reception timing of the corresponding PUSCH may be detected and controlled according to the standards suggested by the embodiments of the present invention described above.

The BS receiving unit 2060 receives the PUSCH on the second serving cell from the UE 2000 on the PUSCH reception timing.

The MAC processing unit 2072 performs the HARQ operation to the BS receiving unit 2060 according to whether the PUSCH is successfully received.

Exemplary embodiments of the present invention may be implemented by hardware, software or a combination thereof. In a hardware configuration, the above-described functions and operations may be performed by one or more processors, such as a microprocessor, a controller, a microcontroller, or an ASIC (Application Specific Integrated Circuit), a DSP (Digital Signal Processor), a PLD (Programmable logic device), a FPGA (Field Programmable Gate Array), and/or combinations thereof configured to perform the functions and operations. In a software configuration, software or program codes to perform the functions and operations may be implemented as modules. Software may be stored in one or more memory units and may be executed by the one or more processors. It will be apparent to those of ordinary skill in the art from the description of the present invention to design, develop and implement the memory units or the processors.

While the present invention has been shown and described in connection with the embodiments, it will be apparent to those skilled in the art that modifications and variations can be made without departing from the spirit and scope of the invention as defined by the appended claims. Thus, the present invention is not limited to the foregoing embodiments and may include all the embodiments within the scope of the appended claims.

What is claimed is:

1. A method of a Hybrid Automatic Repeat reQuest (HARQ) process performed by a User Equipment (UE), the UE supporting a cross-carrier scheduling, the method comprising:
   receiving cross-carrier scheduling information from a base station, the cross-carrier scheduling information indicating a cross-carrier scheduling between a Time Division Duplex (TDD) cell and a Frequency Division Duplex (FDD) cell; and
   when the FDD cell is configured as a scheduled cell, which is scheduled by the TDD cell, executing, by the UE, a process comprising:
   receiving an uplink (UL) through the TDD cell, the UL grant being received in a first subframe of the TDD cell;
   transmitting, from the UE, a Physical Uplink Shared Channel (PUSCH) through the FDD cell, the PUSCH being responsive to the UL grant and transmitted in a second subframe of the FDD cell; and
   receiving a Physical HARQ Indicator Channel (PHICH) through the TDD cell, the PHICH being responsive to the PUSCH and transmitted in a third subframe of the TDD cell,
   wherein the second subframe is determined as a subframe m if the first subframe is determined as a subframe m−4, and the third frame is determined as a subframe m+6 if the second subframe is determined as the subframe m.

2. The method of claim 1, further comprising:
   determining the TDD cell as a scheduling cell to schedule the FDD cell, and monitoring the TDD cell for receiving scheduling information of the FDD cell, wherein a period of the HARQ process of the FDD cell is 10 ms.

3. The method of claim 2, wherein when the FDD cell is the scheduled cell, which is scheduled by the TDD cell, the values of the subframe number m consist of 0, 3, 4, 5, and 9 when the TDD UL/DL configuration of the TDD cell corresponds to 6.

4. The method of claim 1, wherein an uplink/downlink configuration for the TDD cell comprises at least one of uplink/downlink configurations 0, 1,2, 3, 4, 5, and 6 as shown in the following table:

| Uplink/downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D denotes a downlink (DL) subframe, U denotes an uplink (UL) subframe, and S denotes a special subframe.

5. The method of claim 4, wherein when the FDD cell is the scheduled cell, which is scheduled by the TDD cell, the values of the subframe number m consist of 0, 4, 5, and 9 when the TDD UL/DL configuration of the TDD cell corresponds to 0.

6. The method of claim 4, wherein when the FDD cell is the scheduled cell, which is scheduled by the TDD cell, the values of the subframe number m consist of 0, 3, 4, 5, 8, and 9 when the TDD UL/DL configuration of the TDD cell corresponds to 1.

7. The method of claim 4, wherein when the FDD cell is the scheduled cell, which is scheduled by the TDD cell, the values of the subframe number m consist of 0, 2, 3, 4, 5, 7, 8, and 9 when the TDD UL/DL configuration of the TDD cell corresponds to 2.

8. The method of claim 4, wherein when the FDD cell is the scheduled cell, which is scheduled by the TDD cell, the values of the subframe number m consist of 0, 1, 2, 3, 4, 5, and 9 when the TDD UL/DL configuration of the TDD cell corresponds to 3.

9. The method of claim 4, wherein when the FDD cell is the scheduled cell, which is scheduled by the TDD cell, the values of the subframe number m consist of 0, 1, 2, 3, 4, 5, 8, and 9 when the TDD UL/DL configuration of the TDD cell corresponds to 4.

10. The method of claim 4, wherein when the FDD cell is the scheduled cell, which is scheduled by the TDD cell, the values of the subframe number m consist of 0, 1, 2, 3, 4, 5, 7, 8, and 9 when the TDD UL/DL configuration of the TDD cell corresponds to 5.

11. A method of a Hybrid Automatic Repeat reQuest (HARQ) process performed by a base station, the base station supporting a cross-carrier scheduling, the method comprising:
transmitting cross-carrier scheduling information to a User Equipment (UE), the cross-carrier scheduling information indicating a cross-carrier scheduling between a Time Division Duplex (TDD) cell and a Frequency Division Duplex (FDD) cell; and
when the FDD cell is configured as a scheduled cell, which is scheduled by the TDD cell, executing, by the base station, a process comprising:
transmitting an uplink (UL) grant through the TDD cell, the UL grant being received in a first subframe of the TDD cell;
receiving, from the UE, a Physical Uplink Shared Channel (PUSCH) through the FDD cell, the PUSCH being responsive to the UL grant and transmitted in a second subframe of the FDD cell; and
transmitting a Physical HARQ Indicator Channel (PHICH) through the TDD cell, the PHICH being responsive to the PUSCH and transmitted in a third subframe of the TDD cell,
wherein the second subframe is determined as a subframe m if the first subframe is determined as a subframe m−4, and the third frame is determined as a subframe m+6 if the second subframe is determined as the subframe m.

12. The method of claim 11, wherein an uplink/downlink configuration for the TDD cell comprises at least one of uplink/downlink configurations 0, 1,2, 3, 4, 5, and 6 as shown in the following table:

| Uplink/downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D denotes a downlink (DL) subframe, U denotes an uplink (UL) subframe, and S denotes a special subframe.

13. The method of claim 12, wherein when the FDD cell is the scheduled cell, which is scheduled by the TDD cell, the values of the subframe number m consist of 0, 4, 5, and 9 when the TDD UL/DL configuration of the TDD cell corresponds to 0.

14. The method of claim 12, wherein when the FDD cell is the scheduled cell, which is scheduled by the TDD cell, the values of the subframe number m consist of 0, 3, 4, 5, 8, and 9 when the TDD UL/DL configuration of the TDD cell corresponds to 1.

15. The method of claim 12, wherein when the FDD cell is the scheduled cell, which is scheduled by the TDD cell, the values of the subframe number m consist of 0, 2, 3, 4, 5, 7, 8, and 9 when the TDD UL/DL configuration of the TDD cell corresponds to 2.

16. The method of claim 12, wherein when the FDD cell is the scheduled cell, which is scheduled by the TDD cell, the values of the subframe number m consist of 0, 1, 2, 3, 4, 5, and 9 when the TDD UL/DL configuration of the TDD cell corresponds to 3.

17. The method of claim 12, wherein when the FDD cell is the scheduled cell, which is scheduled by the TDD cell, the values of the subframe number m consist of 0, 1, 2, 3, 4, 5, 8, and 9 when the TDD UL/DL configuration of the TDD cell corresponds to 4.

18. The method of claim 12, wherein when the FDD cell is the scheduled cell, which is scheduled by the TDD cell, the values of the subframe number m consist of 0, 1, 2, 3, 4, 5, 7, 8, and 9 when the TDD UL/DL configuration of the TDD cell corresponds to 5.

19. The method of claim 12, wherein when the FDD cell is the scheduled cell, which is scheduled by the TDD cell, the values of the subframe number m consist of 0, 3, 4, 5, and 9 when the TDD UL/DL configuration of the TDD cell corresponds to 6.

20. The method of claim 11, further comprising:
   determining the TDD cell as a scheduling cell to schedule the FDD cell,
   wherein a period of the HARQ process of the FDD cell is 10 ms.

* * * * *